(12) United States Patent
Park et al.

(10) Patent No.: US 11,986,038 B2
(45) Date of Patent: May 21, 2024

(54) METHOD AND SYSTEM FOR CREATING GARMENT DESIGN AND INTEGRATED APPLICATION PROGRAM FOR THE SAME

(71) Applicants: Hojeon Limited, Seoul (KR); Seoul National University R&DB Foundation, Seoul (KR)

(72) Inventors: Young Chul Park, Seoul (KR); Sungmin Kim, Seoul (KR)

(73) Assignees: Hojeon Limited, Seoul (KR); Seoul National University R&DBFoundation, Seoul (KR)

( * ) Notice: Subject to any disclaimer, the term of this patent is extended or adjusted under 35 U.S.C. 154(b) by 206 days.

(21) Appl. No.: 17/626,138

(22) PCT Filed: Jul. 9, 2020

(86) PCT No.: PCT/KR2020/009001
§ 371 (c)(1),
(2) Date: Jul. 11, 2022

(87) PCT Pub. No.: WO2021/006656
PCT Pub. Date: Jan. 14, 2021

(65) Prior Publication Data
US 2022/0361612 A1 Nov. 17, 2022

(30) Foreign Application Priority Data
Jul. 11, 2019 (KR) .................. 10-2019-0083722

(51) Int. Cl.
*A41H 3/00* (2006.01)
(52) U.S. Cl.
CPC .................................. *A41H 3/007* (2013.01)
(58) Field of Classification Search
CPC ...... A41H 3/007; G06Q 10/101; G06Q 50/04; Y02P 90/30
See application file for complete search history.

(56) References Cited

U.S. PATENT DOCUMENTS

| | | | |
|---|---|---|---|
| 2007/0198118 A1* | 8/2007 | Lind | A41H 3/007 700/138 |
| 2009/0222127 A1* | 9/2009 | Lind | G06Q 30/0601 705/26.1 |

(Continued)

FOREIGN PATENT DOCUMENTS

| | | | | |
|---|---|---|---|---|
| JP | 2001-262416 A | | 9/2001 | |
| JP | 2001262416 A | * | 9/2001 | ............. G06T 13/20 |

(Continued)

OTHER PUBLICATIONS

Liu et al., "Parametric Design of Garment Pattern Based on Body Dimensions;"International Journal of Industrial Ergonomics; Published on line Jun. 4, 2019; pp. 212-221;10 Pages (Year: 2019).*

(Continued)

*Primary Examiner* — Michael Le
(74) *Attorney, Agent, or Firm* — DALY, CROWLEY, MOFFORD & DURKEE, LLP

(57) ABSTRACT

Program modules for works such as making garment flat sketches, patterns and work orders, and performing 3D drape simulations, etc. are implemented as one integrated software package and can be made into one executable file. With the software package, garment patterns can be created in a parametric design manner. Parametric garment patterns can be imported to be performed 3D drape simulation on a 3D human model, and the size and shape of the patterns can be modified. The modification history of the patterns is stored separately, and even if the size of the pattern is changed, a pattern in which the modification history is reflected can be automatically generated. By using this integrated software package, all tasks necessary for 2D flat sketch drawing, patterning, 3D drape simulation, and work order production can be performed in an integrated manner with interconnection with each other.

28 Claims, 19 Drawing Sheets

(56) References Cited

U.S. PATENT DOCUMENTS

| | | | |
|---|---|---|---|
| 2017/0105468 A1* | 4/2017 | Ngo Ngoc | G06F 30/00 |
| 2019/0150543 A1* | 5/2019 | Selvarajan | A41H 3/02 |
| 2019/0272679 A1* | 9/2019 | Brodsky | G06F 30/20 |
| 2022/0139788 A1* | 5/2022 | Okuyama | H01L 21/67276 |
| | | | 702/167 |

FOREIGN PATENT DOCUMENTS

| | | | | |
|---|---|---|---|---|
| JP | 2002-279014 A | | 9/2002 | |
| JP | 2002279014 A | * | 9/2002 | ............ D05B 19/08 |
| JP | 2006-512486 A | | 4/2006 | |
| JP | 2006512486 A | * | 4/2006 | |
| KR | 10-1727576 B1 | * | 4/2017 | |
| KR | 10-1727576 B1 | | 4/2017 | |
| KR | 101727576 B1 | * | 4/2017 | |

OTHER PUBLICATIONS

Liu et al., "Parametric Design of Garment Pattern Based on Body Dimensions;" International Journal of Industrial Ergonomics; Published online Jun. 4, 2019; pp. 212-221; 10 Pages.
International Search Report (with English Translation) dated Oct. 22, 2020 for International Application No. PCT/KR2020/009001; 4 Pages.

* cited by examiner

USER INTERFACE (1100) FOR MAKING 3D HUMAN BODY MODEL

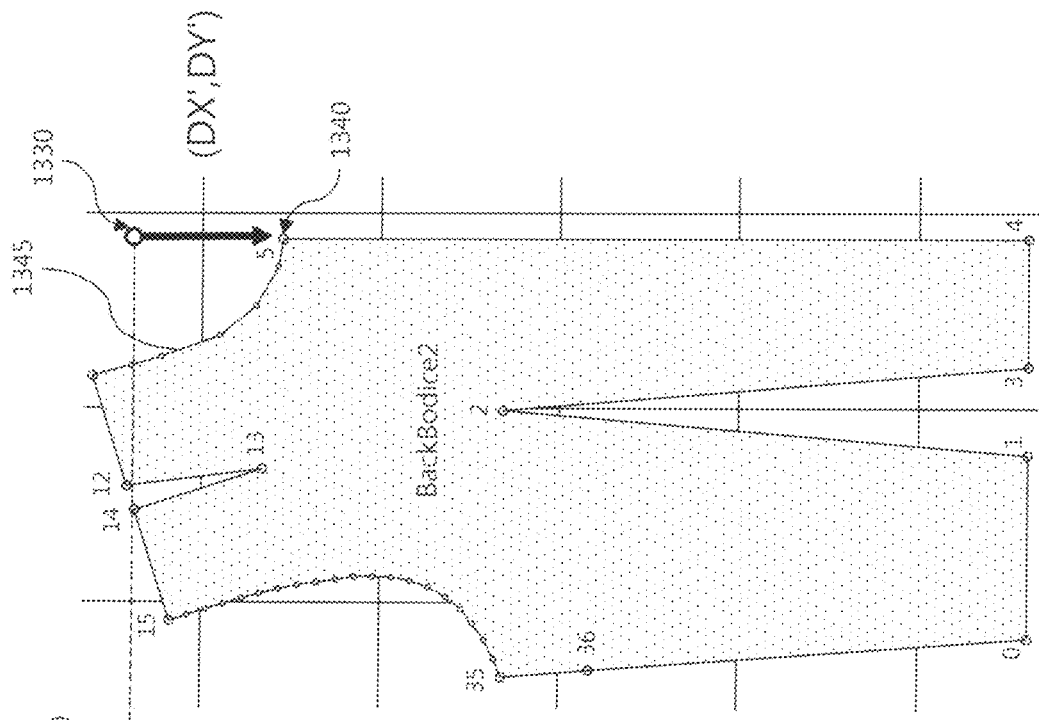
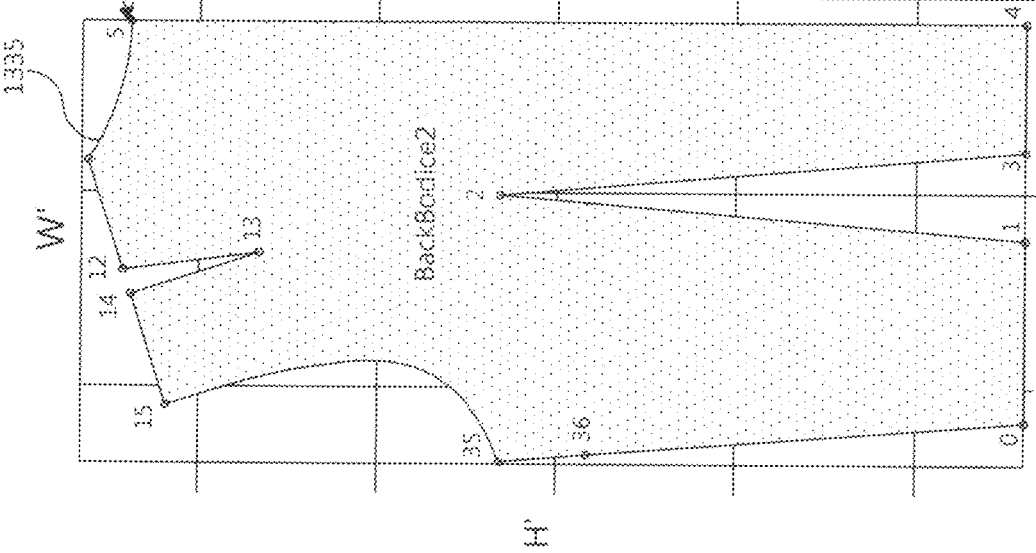
FIG. 19

METHOD AND SYSTEM FOR CREATING GARMENT DESIGN AND INTEGRATED APPLICATION PROGRAM FOR THE SAME

CROSS-REFERENCE TO RELATED APPLICATIONS

This application is a U.S. National Stage Application of International Application No. PCT/KR2020/009001 filed on Jul. 9, 2020 which is based upon and claims the benefit of priority to Korean Patent Application No. 10-2019-0083722 filed on Jul. 11, 2019 in the Korean Intellectual Property Office. The disclosures of the above-listed applications are hereby incorporated by reference herein in their entirety.

BACKGROUND

1. Technical Field

The present invention relates to garment design technology, and more particularly to a garment design technology that integrates the whole process of garment flat sketch production, pattern production, work order creation, and virtual fitting and sewing through 3-Dimensional (3D) simulation so that the work results of each stage can be used in other stages.

2. Description of the Related Art

Garment design technologies using a computer system are developing day by day. A general-purpose vector graphics tool such as Adobe Illustrator has been used to create a 2-dimensional (2D) flat sketch of a garment to be made. However, since the tool is not the specialized software for creating garment flat sketches, there are many inconveniences.

It is necessary to create garment patterns based on the 2D flat sketch created for the garment design. In the past, garment patterns were generated using a pattern CAD program. The existing pattern CAD program provides a function to create a pattern by inputting a paper pattern into a computer and modifying the pattern graphic displayed on the screen.

In pattern production, even for garments of the same shape, the size of the pattern varies depending on the size of garment, so a separate pattern must be prepared for each size. However, the existing pattern CAD program does not provide interconnection between elements (points, lines, etc.) constituting the pattern when creating a pattern, so the pattern elements have an independent relationship with each other. Therefore, when it is necessary to produce patterns of one shape in several sizes, it is necessary to create patterns for each size separately. That is, in the existing pattern creation method, even if a pattern for one size (basic size) is generated, in order to create a pattern of another size, it is necessary to repeatedly perform the previous work almost as it is. The contents of the operation of creating a pattern of the same shape with different sizes are substantially the same, but it is inefficient to repeat the operation for each size.

A drape simulation technology in which garment patterns are generated on a virtual 3D human body model in a computer is applied thereto is also known. However, most existing drape simulation programs perform drape simulation on a 3D human body model by loading patterns fixed to specific sizes, setting sewing conditions, and performing virtual sewing. The existing 3D drape simulation programs do not provide a function to change the sizes of patterns to be simulated. Therefore, in order to drape simulation patterns of different sizes, it is necessary to repeat the operation of loading the patterns of each size separately each time and setting the sewing conditions and spatial arrangement conditions for the patterns. The hassle and inefficiency of having to repeat the same works over and over are unavoidable.

In addition, the existing 3D drape simulation program does not provide a function of changing a garment pattern of a specific size in a draped-simulated state to a garment pattern of another size or changing the shape of the garment pattern to other shape. That is, the 3D drape simulation program does not provide a pattern modification function to change the sizes or shape of the existing pattern. Furthermore, it is of course not possible to provide a function to change the sizes and even the shape in a state where patterns of specific sizes are draped in simulation.

As such, due to the limited functions of and interoperability between the existing garment pattern creation program and the 3D drape simulation program, the works for garment pattern creation and the 3D drape simulation were made quite inefficiently.

In addition, the existing garment flat sketch creation program includes only a function for creating flat sketches, and the conventional garment pattern creation programs have only a function for creating garment patterns. The conventional 3D drape simulation program also includes only a function of drape simulation using given garment patterns, so it cannot provide a function of modifying the garment patterns. Moreover, the garment pattern creation program, the 3D drape simulation program, and the garment flat sketch creation program were not made in the form of one integrated computer program, but were made as separate and independent programs. Therefore, these three programs are used inevitably in a way that they are executed separately.

The existing garment flat sketch creation program, garment pattern creation program, and 3D drape simulation program are not designed to mutually utilize the data they create. In other words, the three programs store and manage the data created by each of them in a state where there is no linkage between them. It may be very inconvenient or difficult for one program to retrieve data created by other program and utilize the data for subsequent work. For example, even after a garment flat sketch is completed by using the garment flat sketch creation program, the garment pattern creation program and the 3D drape simulation program cannot find similar pattern results or 3D simulation results, respectively. That is, in order to make a pattern corresponding to the garment flat sketch created by an operator (a designer) using the garment flat sketch creation program, the operator by himself or herself must search the pattern result corresponding to the garment flat sketch which is similar to the created garment flat sketch or proceed with a new work to create the pattern from a basic pattern. For 3D simulation, if there is a 3D simulation result corresponding to the similar garment flat sketch, the operator must manually load the simulation result and proceed with the operation.

SUMMARY

It is an object of the present invention to provide an integrated garment design application program, stored in a computer-readable recording medium and combined with a computer, that can create garment patterns in a parametric design way, 3D-simulate the created parametric garment patterns on a 3D human body model, and allow the patterns in the drape simulated state to be modified, and a recording medium on which the program is recorded. And it is also the object of the present invention to provide a garment design creation method and system that can efficiently and conveniently create a garment design using the application program.

It is another object of the present invention to provide an integrated garment design application program, stored in a computer-readable recording medium and combined with a computer, made in the form of an execution file by integrating a module for creating garment flat sketches, a module for creating garment patterns in a parametric design method, and a module for 3D-drape-simulating the created parametric garment patterns on a 3D human body model, that can greatly improve the efficiency, convenience, and productivity of the overall garment design work, by associating various garment design-related result data generated by the modules with each other for each garment to be stored and managed in an integrated way, and allowing the desired data to be retrieved and easily utilized for subsequent work, when necessary. And it is further another object of the present invention to provide a recording medium on which the application program is recorded, a garment design creation method and system that can create a garment design using the application program.

It is further another object of the present invention to provide an integrated garment design application program that supports multiple related parties involved in garment design, manufacturing, sales and purchasing to collaboratively perform in an online space the garment related works such as ordering, designing, producing garments, and the like by executing the integrated garment design application program on a server computer to provide clients with relevant services. And it is further another object of the present invention to provide a recording medium on which the application program is recorded, and a garment design creation method and system that can create a garment design using the application program.

It is further another object of the present invention to provide an integrated garment design application program, combined with a computer, that provides, through a single file, integrated functions capable of storing and managing flat sketches, parametric garment pattern equations, work order sheets, etc. for each garment to be mutually associated, searching flat sketches that are similar to the garments images, creating parametric garment patterns that corresponds to a garment image by importing garment flat sketches, and performing drape simulation on a 3D human body model by importing pattern equations for parametric garment patterns made. And it is further another object of the present invention to provide a method and system for creating a garment design creation method and system using the application program.

The problem to be settled by the present invention is not limited to the above-described problems, and may be variously expanded without departing from the spirit and scope of the present invention.

An integrated system for creating a garment design according to embodiments for realizing the objects of the present invention includes a computer device comprising a processor and a memory, and a non-transitory computer-readable storage medium, being accessible by the processor, for storing program codes. The program codes, when executed by the processor, causes the processor to: provide a first user interface including a pattern creation tool unit requested by a user through a display screen so that the user can create parametric garment patterns of a garment in a parametric design method, wherein the pattern creation tool unit is configured to provide a first function for the user to define pattern elements including points and lines defining pattern geometry of a parametric garment pattern desired by the user in the parametric design method to be displayed on the display screen, and a second function for the user to set sewing condition information including information specifying seam lines to be sewn with each other between parametric garment patterns created using the first function, and arrangement condition information of the parametric garment patterns on a three-dimensional (3D) human body model; store parametric pattern equations defining parametric garment patterns created by using the first function and the second function of the pattern creation tool unit, sewing condition information and arrangement condition information set, in linkage with the identification information of the garment in a data storage; display a predetermined 3D human body model requested by the user on the display screen; search parametric pattern equations, sewing condition information and arrangement condition information corresponding to parametric garment patterns of the garment requested by the user from the data storage; automatically place and virtually sew parametric garment patterns corresponding to the searched parametric pattern equation on the 3D human body model according to the searched sewing condition information and arrangement condition information so that a 3D drape simulation image of the garment applied to the 3D human body model is created to be displayed on the display screen; and store the created 3D drape simulation image in linkage with the garment in the data storage.

In an embodiment of the present invention, a parametric garment pattern equation and a 3D drape simulation image for the same garment, stored in the data storage, may be linked with each other so that one can be retrieved from the other.

In an embodiment of the present invention, the pattern creation tool unit may be configured to further provide a function of generating a body size list in which one or more body part sizes are included, and a parameter list in which one or more parameters defined by including a desired body part size among the one or more body part sizes as a parameter are included.

In an embodiment of the present invention, the pattern creation tool unit may be configured to further provide a function of defining points and/or lines specifying the parametric garment pattern by a predetermined relational expression when creating the parametric garment pattern, and wherein the predetermined relational expression includes, as parameters, one or more body part sizes included in the body size list, one or more parameters included in the parameter list, and at least a part of previously created points and/or lines.

In an embodiment of the present invention, the pattern creation tool unit may be configured to further provide a pattern region setting function for defining a pattern region in which a garment pattern is created, and wherein a basic size of the pattern region is defined using the body part sizes listed in the body size list as parameters.

In an embodiment of the present invention, the pattern creation tool unit may be configured to further provide a function of generating a second garment pattern symmetrical to a first garment pattern by symmetrically transforming the first garment pattern displayed on the display screen around a predetermined reference line, and a function of duplicating a third garment pattern displayed on the display screen to increase number of same third garment pattern.

In an embodiment of the present invention, the program codes, when executed by the processor, may cause the processor to provide, via the display screen, a second user interface comprising a flat sketch creation tool capable of drawing a garment flat sketch requested by the user, and to make a garment flat sketch created using the flat sketch creation tool on the display screen be linked with at least one of a corresponding garment, a parametric pattern equation associated with the corresponding garment, and a 3D drape simulation image associated with the corresponding garment, to be stored in the data storage.

In an embodiment of the present invention, the flat sketch creation tool may provide a flat sketch grouping function by which the user can group a plurality of flat sketches created into a flat sketch group and request the flat sketch group to be registered in the data storage.

In an embodiment of the present invention, the flat sketch creation tool may provide a function of specifying a coupling reference point that the allows the user to set a coupling reference point that becomes a reference when combining a single garment flat sketch or a flat sketch group including a plurality of garment flat sketches with other garment flat sketch, and allow the garment flat sketches of which coupling reference points are set to be coupled with each other by automatically adjusting sizes and orientations of the garment flat sketches so that their coupling reference points are overlapped with each other.

In an embodiment of the present invention, the program code, when executed by the processor, may cause the processor to further provide, through the second user interface, a flat sketch search tool capable of searching for a garment flat sketch similar to a garment image input by the user, and to search a garment flat sketch similar to an garment image input through the flat sketch search tool from the garment flat sketches stored in the data storage and editably display a garment flat sketch searched on the display screen.

In an embodiment of the present invention, the program code, when executed by the processor, causes the processor to search desired flat sketch data from the data storage, and search a parametric pattern equation in linkage with flat sketch data searched from the data storage.

In an embodiment of the present invention, the program code, when executed by the processor, may cause the processor to provide a function to make a work order regarding a parametric garment pattern created through the first user interface, and to store the work order made in the data storage in linkage with a parametric pattern equation of corresponding parametric garment pattern.

In an embodiment of the present invention, the program code, when executed by the processor, may cause the processor to search a desired garment flat sketch from the garment flat sketches stored in the data store, when creating the parametric garment pattern through the first user interface, and to display the searched garment flat sketch on the display screen to be referred to in the creation of the parametric garment pattern.

In an embodiment of the present invention, at least a part of the points defining a shape of the parametric garment pattern may be generated such that position of the at least a part of the points is determined by a predetermined relation including a position of previously generated point as a parameter.

In an embodiment of the present invention, the program code, when executed by the processor, may cause the processor to allow the user to modify a shape of a parametric garment pattern by moving a position of a desired point among points defining the shape of the parametric garment pattern displayed on a display screen, and when the position of the desired point is moved, to change positions of other points that are defined by a predetermined relational expression including the position of the desired point as a parameter together according to a position movement amount of the desired point and the predetermined relational expression.

In an embodiment of the present invention, a barrel-shaped body part boundary surface surrounding a corresponding body part may be set for each body part of the predetermined 3D human body model, and wherein the arrangement condition information includes information on which body part boundary surfaces of the predetermined 3D human body model the parametric garment patterns should be arranged on respectively.

In an embodiment of the present invention, the 3D human body model may include at least one male model and one female model to which basic body sizes are applied respectively, and when the body size is changed, sizes of the 3D human body model and boundary surface of each body part may be changed in association with the changed body size.

In an embodiment of the present invention, the arrangement condition information may include information on a pattern reference point used as a reference and boundary surface information on which body part boundary surface of the 3D human body model the pattern reference point should be placed on when the parametric garment patterns are placed on the 3D human body model, and the 3D human body model may include boundary reference points each of which is specified for each corresponding body part boundary surface, and wherein the program code, when executed by the processor, may cause the processor, when arranging the parametric garment pattern on the 3D human body model, to arrange the parametric garment pattern so that a pattern reference point of the parametric garment pattern overlaps a boundary reference point of a boundary surface of a body part corresponding to the boundary surface information.

In an embodiment of the present invention, wherein the program code, when executed by the processor, may cause the processor to function as a server computer for a plurality of client computer devices; allow any of the client computer devices connected to the processor to create a collaboration room; provide desired parametric garment patterns and/or 3D drape simulation images to client computer devices of relevant parties participating in the collaboration room to be displayed on each client computer device; and support communications so that the relevant parties participating in the collaboration room can exchange opinions and/or collaborate modifications while viewing the displayed parametric garment patterns and/or 3D drape simulation images.

In an embodiment of the present invention, the program code, when executed by the processor, may cause the processor to provide a function to display identifiably amounts of strains applied to respective parts of the predetermined garment on the 3D human body model on the 3D drape simulation image.

In an embodiment of the present invention, the program code, when executed by the processor, may cause the processor to provide a function to display identifiably a size of a gap between the predetermined garment put on the 3D human body model and a corresponding body part of the 3D human body model, on the 3D drape simulation image.

In an embodiment of the present invention, the program code, when executed by the processor, may cause the processor to provide a function to display identifiably a size of a gap between the predetermined garment put on the 3D human body model and a corresponding body part of the 3D human body model, on the 3D drape simulation image.

In an embodiment of the present invention, the data storage may include a nonvolatile storage device providing a physical storage space for data storage; and a database management program configured to build a database in the non-volatile storage device to store data related garments, wherein data related to each garment are stored in linkage with each other, and to search and return data requested by the user from the database.

In an embodiment of the present invention, the program code, when executed by the processor, may cause the processor to assign unique identification information to each individual garment, and storing parametric pattern equations, set sewing condition information and arrangement condition information, and a 3D drape simulation image for each garment in linkage with each other through the identification information of the each garment.

In an embodiment of the present invention, the program code, when executed by the processor, may cause the processor to provide a virtual fitting operator that allows the user to move a specific point and/or line segment when producing a parametric pattern to finely modify width and/or length of a specific part of the parametric pattern.

In an embodiment of the present invention, the program code, when executed by the processor, may cause the processor to retrieve a pattern modification history if the pattern modification history is stored in linkage with a parametric pattern equation in the data storage when searching the parametric pattern equation from the data storage; generate the parametric garment pattern on the display screen to be displayed using the parametric pattern equation searched so that the user can modify a shape of the parametric garment pattern; and when there is a modification to the parametric garment pattern, collect a relevant pattern modification history to be stored in the data storage in linkage with a corresponding parametric pattern equation.

In an embodiment of the present invention, the program code, when executed by the processor, may cause the processor, when both a parametric pattern equation and a pattern modification history for a pattern having a modification history are loaded together, to generate an initial pattern first using the parametric pattern equation and then a modified pattern to be displayed on the display screen by applying the pattern modification history to the initial pattern.

In an embodiment of the present invention, the program code, when executed by the processor, may cause the processor to allow the user to modify a shape of the parametric garment pattern by moving a position of points defining the garment pattern, wherein when a position of the point is actually moved by DX in a X-axis direction and/or by DY in a Y-axis direction through modification of the parametric garment pattern, a movement amount dx in the X-axis direction and/or a movement amount dy in the Y-axis direction to be stored in the data storage as pattern modification history may be determined as a movement amount relative to width and height of the parametric garment pattern by dx=DX/W and dy=DY/H, where W and H represent the width and height of the parametric garment pattern, respectively.

In an embodiment of the present invention, the program code, when executed by the processor, may cause the processor, when the pattern modification history loaded from the data storage includes position movement amounts dx and/or dy of any of the points defining the parametric garment pattern and the loaded parametric garment pattern is changed to a different size to be displayed, to determine new position movement amounts (DX', DY') of the moved point are determined by DX'=dx×W' and DY'=dy×H', where W' and H' are width and height of a parametric garment pattern after size change.

Meanwhile, a method for creating a garment design according to embodiments for realizing the objects of the present invention includes executing a sequence of instructions for causing a processor of a computing system to perform a plurality of functions related to garment design. The plurality of functions include: a function of providing a pattern creation tool unit including a first function for a user to define pattern elements including points and lines defining pattern geometry of a desired parametric garment pattern in a parametric design method to be displayed on a display screen, and a second function for the user to set sewing condition information including information specifying seam lines to be sewn with each other between parametric garment patterns created using the first function, and arrangement condition information of the parametric garment patterns on a three-dimensional (3D) human body model; a function of providing a first user interface including the pattern creation tool unit requested by the user through the display screen so that the user can create parametric garment patterns of a garment in the parametric design method; a function of storing parametric pattern equations defining parametric garment patterns created by using the first function and the second function of the pattern creation tool unit, sewing condition information and arrangement condition information set, in linkage with the identification information of the garment in a data storage; a function of displaying a predetermined 3D human body model requested by the user on the display screen; a function of searching parametric pattern equations, sewing condition information and arrangement condition information corresponding to parametric garment patterns of the garment requested by the user from the data storage; a function of automatically placing and virtually sewing parametric garment patterns corresponding to the searched parametric pattern equations on the 3D human body model according to the searched sewing condition information and arrangement condition information so that a 3D drape simulation image of the garment applied to the 3D human body model is created to be displayed on the display screen; and a function of storing the created 3D drape simulation image in linkage with the garment in the data storage.

Meanwhile, an integrated application program for creating a garment design according to embodiments for realizing the objects of the present invention is combined with hardware of a computer device to create a desired garment design and stored on a computer-readable recording medium. The application program includes a garment data storage/management unit, a parametric pattern-making unit, and a 3D drape simulation unit. The garment data storage/management unit is configured to include a function of storing and managing parametric garment pattern equation data and three-dimensional (3D) drape simulation data corresponding to each individual garment in a data storage so as to be linked with each other; and a function of providing a search result by searching data requested by a user from the data stored in the data storage. The parametric pattern making unit is configured to provide a function of providing a first user interface including a pattern creation tool unit through a display screen so that the user can create parametric garment patterns of a garment in a parametric design method, wherein the pattern creation tool unit includes a first function for the user to define pattern elements including points and lines defining pattern geometry of a desired parametric garment pattern in the parametric design method to be displayed on the display screen, and a second function for the user to set sewing condition information including information specifying seam lines to be sewn with each other between parametric garment patterns created using the first function, and arrangement condition information of the parametric garment patterns on a 3D human body model; a function of setting sewing condition information for created parametric garment patterns and arrangement condition information of the parametric garment patterns on the 3D human body model; and a function of associating a parametric pattern equation defining created parametric garment patterns, and set sewing condition information and arrangement condition information with identification information of the garment and providing the associated information to the garment data storage/management unit to be stored in the data storage. The 3D drape simulation unit is configured to include a function of searching parametric pattern equations, sewing condition information and arrangement condition information corresponding to parametric garment patterns of the garment requested by the user from the data storage; a function of automatically placing and virtually sewing parametric garment patterns corresponding to the searched parametric pattern equations on the 3D human body model according to the searched sewing condition information and arrangement condition information so that a 3D drape simulation image of the garment applied to the 3D human body model is created; a function of displaying the created 3D drape simulation image on the display screen; and a function of storing the created 3D drape simulation image in linkage with the garment in the data storage of the garment data storage/management unit.

In an embodiment of the present invention, the application program may further include a flat sketch creation tool unit that allows the user to create a new garment flat sketch and/or edit a garment flat sketch retrieved from the data storage; and a garment flat sketch production unit configured to provide a garment flat sketch upload function of uploading created and/or edited garment flat sketch data to the data storage to be stored through the garment data storage/management unit.

According to exemplary embodiments of the present invention, the program modules that enable the operations of pattern production and work order making, 3D drape simulation of the prepared garment pattern, etc. are integrated and can be implemented as an execution file of one application program. Furthermore, the integrated application program may further incorporate a program module that enables the creation of garment flat sketches (2D designs). These two or three application program modules are not simply combined, but are organically combined with each other so that any one program module can call the outputs of the other program modules and carry on the necessary follow-up work. The result data generated by application program modules are stored in association with each other based on each garment. Therefore, users can search for garment flat sketches, garments patterns, and 3D drape simulation results related to desired garments in various convenient ways when necessary, and they can perform necessary tasks effectively and easily by reading the retrieved data. In addition, by using this integrated software package, the various work stages until the design of one garment is completed, namely, all necessary tasks in the 2D flat sketch creation stage, pattern creation stage, 3D drape simulation stage using 3D human body model, and work order preparation stage can be performed in an integrated manner with interconnection.

Furthermore, the work result data of respective design work stages may be stored and managed so as to have association with each other, respectively. That is, it is possible to store and manage flat sketch data, pattern data, work order data, and 3D drape simulation data related to any one garment by connecting them with each other. One garment flat sketch work result may have a linkage with a pattern work result associated therewith, and a pattern work result may have a linkage with a 3D drape simulation work result linked thereto. The results of the work in each stage can be used as it is in the work in other stages, so that a series of tasks for garment design can be efficiently linked with each other. When the user selects one garment flat sketch result, the pattern work result directly linked to it (or, when there is no directly linked pattern work result, the pattern work result linked to the flat sketch similar to the selected garment flat sketch result) and 3D drape simulation result can be easily imported and additional work can be done quickly. In a series of design work processes, not only can the work performance of the previous stage be inherited, but also the modifications of the subsequent stages can be reflected back to the work result of the previous stage, so that a lot of unnecessary repetitive work can be omitted. It can greatly increase the overall efficiency and productivity of garment design work.

In addition, according to an exemplary embodiment of the present invention, respective design work results (flat sketch data, pattern data, work order data, 3D drape simulation data, etc.) for each garment have linkage with each other and are cumulative using the database. Because they can be stored and managed as a product, it is also possible to search for and use the existing design results to design other garments that are similar to each other partially or wholly.

According to an exemplary embodiment of the present invention, all design data (flat sketch data, pattern data, work order data, 3D drape simulation data, etc.) required for garment manufacturing can be easily extracted from the database and packaged. In addition, the packaged design data can be transferred to a garment factory for immediate use in garment production. After all, according to the present invention, a foundation can be secured for the entire process from design to production of garments to be performed in an integrated way.

According to the exemplary embodiments of the present invention, since the flat sketch result, the pattern result, and the 3D simulation result have interrelated information, it is possible to use the set of information to perform the works for making the flat sketch, the pattern, and the 3D simulation very efficiently. That is, when the user completes the desired flat sketch result, the system according to the present invention can find a flat sketch image similar to this from the flat sketch database DB, find patterns associated with it from the pattern DB, and automatically suggest the pattern found to the user. By doing this, the user can conveniently and efficiently perform the pattern work suitable for the flat sketch.

Furthermore, when a result of the flat sketch work or pattern result work is generated, the system according to the present invention can find the most similar 3D simulation from the 3D simulation DB and suggest it to the user. Accordingly, the user can perform the desired 3D simulation with minimal modification work, enabling efficient work.

By executing the integrated application program according to the exemplary embodiments of the present invention on a server computer, functions of the integrated application program can be serviced to a plurality of client computers accessing the server computer. Designers, patterners, sewing workers, and garment buyers involved in garment design can each perform necessary tasks through their client computers using the functions provided by the integrated application program. If necessary, the parties concerned can collaborate online, such as discussing the design of a garment.

BRIEF DESCRIPTION OF THE DRAWINGS

FIG. 19 is a diagram for describing an amount of movement of one point position moved previously when the size of the pattern is changed.

DETAILED DESCRIPTION OF THE EMBODIMENTS

Figure 1:
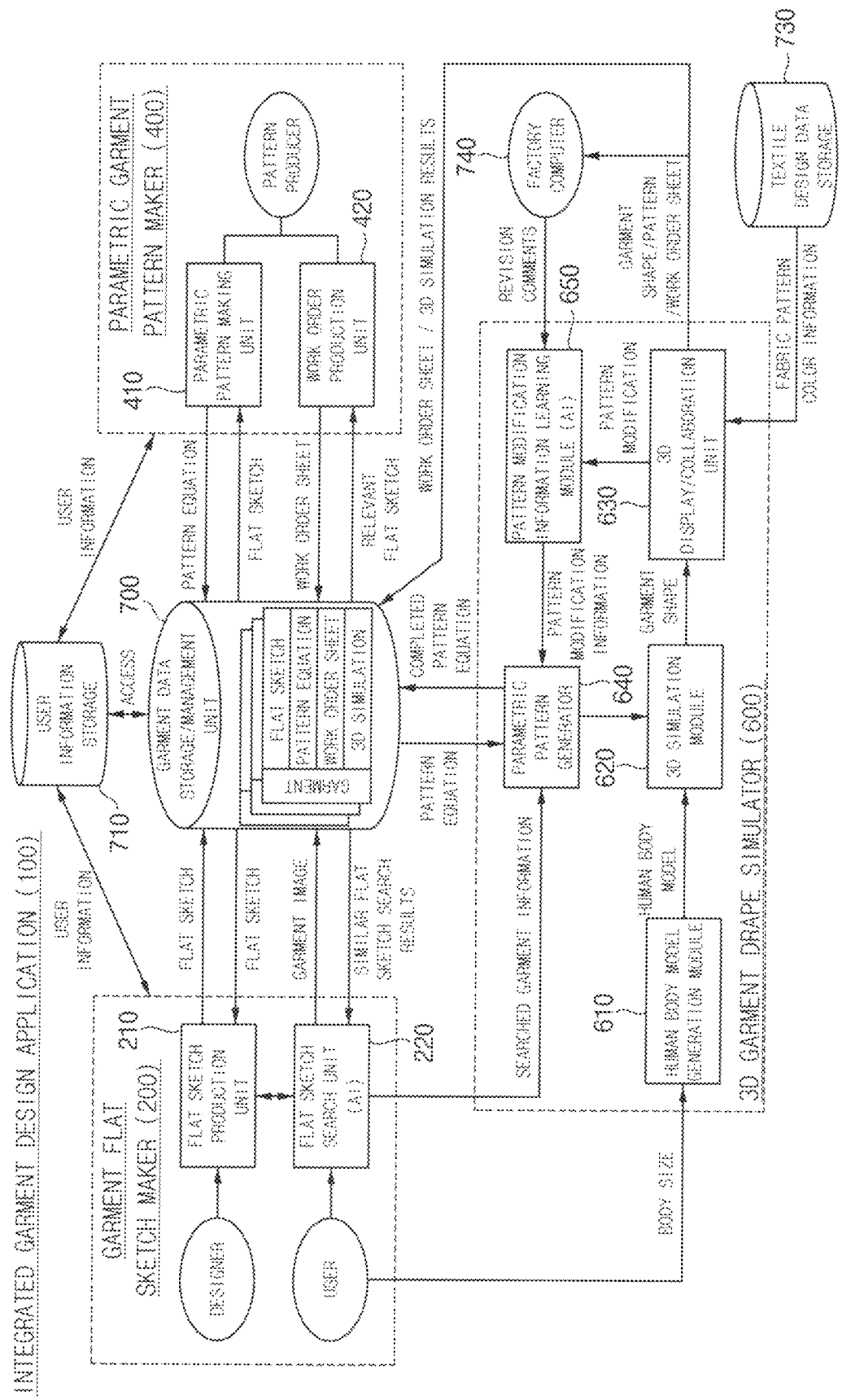
FIG. 1 is a block diagram showing the overall configuration of an integrated garment design application program according to an exemplary embodiment of the present invention.

Hereinafter, preferred embodiments of the present invention will be described in more detail with reference to the accompanying drawings. The same reference numerals are used for the same components in the drawings, and repeated descriptions of the same components are omitted.

With respect to the embodiments of the present invention disclosed below, specific structural and functional descriptions are merely exemplified for the purpose of describing the embodiments of the present invention. Embodiments of the present invention may be realized in various forms, and should not be construed as being limited to the embodiments described herein. That is, since the present invention can have various changes and can have various forms, specific embodiments are illustrated in the drawings and described in detail in the text. However, this is not intended to limit the present invention to the specific disclosed form, it should be understood to include all modifications, equivalents and substitutes included in the spirit and scope of the present invention.

The terms used herein are for describing particular example embodiments only and are not intended to limit the present inventive concept. As used herein, the singular forms "a," "an" and "the" are intended to include the plural forms as well, unless the context clearly indicates otherwise. It will be further understood that the terms "comprise" and/or "include," when used in this specification, specify the presence of stated features, integers, steps, operations, elements, components, or combination thereof, but do not preclude the presence or addition of one or more other features, integers, steps, operations, elements, components, and/or groups thereof. It will be understood that, although the terms first, second, third etc. may be used herein to describe various elements, these elements should not be limited by these terms. These terms are used to distinguish one element from another.

FIG. 1 shows the overall configuration of an integrated garment design application program 100 according to an exemplary embodiment of the present invention.

Referring to FIG. 1, the integrated garment design application program 100 may include a parametric garment pattern maker 400, a 3D garment drape simulator 600, and a garment data storage & management unit 700. The integrated garment design application program 100 may further include a garment flat sketch maker 200.

The parametric garment pattern maker 400 may provide various functions that allow a user to create a desired garment pattern on the computer display screen. In particular, the parametric garment pattern maker 400 may support the user to create a garment pattern using a parametric design technique when creating a garment pattern. The parametric garment pattern maker 400 may generate a parametric garment pattern equation that defines a garment pattern created by the user on a computer screen to be stored in the garment data storage & management unit 700. Details on this will be described later.

The 3D garment drape simulator 600 may provide a function for a user to load desired parametric garment patterns from the garment data storage & management unit 700 in a computer system, sew them virtually, and automatically apply them to a 3D human body model to be displayed on the computer display screen. The parametric garment patterns may be prepared using the parametric garment pattern maker 400. The 3D garment drape simulator 600 may cause a 3D drape simulation image to be displayed on the display screen. The 3D garment drape simulator 600 may provide a function for the user to change the size, modify the shape of the pattern, etc. with respect to the parametric garment patterns applied to the 3D human body model. Pattern modifications may be stored and managed separately.

The garment flat sketch maker 200 provides a function that allows a user to create 2D flat sketches of desired garments on the computer display screen, and store the created garment 2D flat sketches in the garment data storage & management unit 700 or retrieve the stored garment 2D flat sketches.

The garment data storage & management unit 700 may provide a function to store and manage various data related to garments, such as parametric pattern equations and 3D drape simulation results of the created parametric garment patterns, work orders for garment production, and 2D flat sketches in a non-volatile data storage. These data may be stored by providing correlation with each other according to a predetermined criterion to be searchable. In addition, the garment data storage & management unit 700 may provide a search service for the stored garment related data.

In an exemplary embodiment, the garment flat sketch maker 200, the parametric garment pattern maker 400, and the 3D garment drape simulator 600 may be implemented as application programs executable on the computer device. In an exemplary embodiment, the garment flat sketch maker 200, the parametric garment pattern maker 400, and the 3D garment drape simulator 600 may each be implemented as separate and independent application program modules. The garment data storage & management unit 700 may be also implemented as a separate independent application program module.

In an exemplary embodiment, the application program modules of the garment flat sketch maker 200, the parametric garment pattern maker 400, the 3D garment drape simulator 600, and the garment data storage & management unit 700 may be made into separate execution files respectively and are independently executed on the computer device. In this case, an unnecessary and inconvenient process may be required in order to utilize the result data created by using any one application program module in any work using any other application program module.

In another embodiment to solve this inconvenience, the application program modules of the garment flat sketch maker 200, the parametric garment pattern maker 400, the 3D garment drape simulator 600, and the garment data storage & management unit 700 may be integrated into a single execution file. By executing the single execution file on the computer device, the user can conveniently use all the functions of the application program modules incorporated in the execution file. Of course, only some of the application program modules, for example, the application program modules of the parametric garment pattern maker 400, the 3D garment drape simulator 600, and the garment data storage & management unit 700 may be integrated into one execution file.

If the program modules 200, 400, and 600 for three different tasks are integrated into one execution file, there are several advantages. With the single execution file running on the computer device, users can conveniently perform all tasks such as garment flat sketch production, garment pattern production, 3D simulation of the produced pattern, and virtual fitting using the 3D simulation result as desired. For example, a user can conveniently and quickly switch between tasks such as flat sketch creation, pattern making, 3D simulation, and the like from one task to another, and perform a connection task while maintaining connectivity between the tasks. For example, in an environment where the single execution file of the application program is executed on a server computer and serviced in a server-client method, users in various fields such as designers, patterners, garment manufacturers, garment distributors, etc. may perform very conveniently and efficiently various types of collaboration works related to the design, manufacturing and sale of garments by logging on to the application program running on the server computer device.

The execution file of the application program modules of the garment flat sketch maker 200, the parametric garment pattern maker 400, the 3D garment drape simulator 600, and the garment data storage & management unit 700 may be stored in a non-transitory to non-volatile recording medium (e.g., hard disk, flash memory, CD-ROM, etc.) that can be read by a computer device. The execution file may be executed by, for example, a processing unit including a processor 810 and a memory provided in a general-purpose computer device to provide respective functions.

In an exemplary embodiment, the garment flat sketch maker 200, the parametric garment pattern maker 400, and the 3D garment drape simulator 600 may utilize the data storage managed by the garment data storage & management unit 700 as a common storage. That is, the garment flat sketch maker 200, the parametric garment pattern maker 400, and the 3D garment drape simulator 600 store data in the data storage through the garment data storage & management unit 700, respectively, or retrieve the data stored in the data storage to be used for subsequent work.

Figure 2:
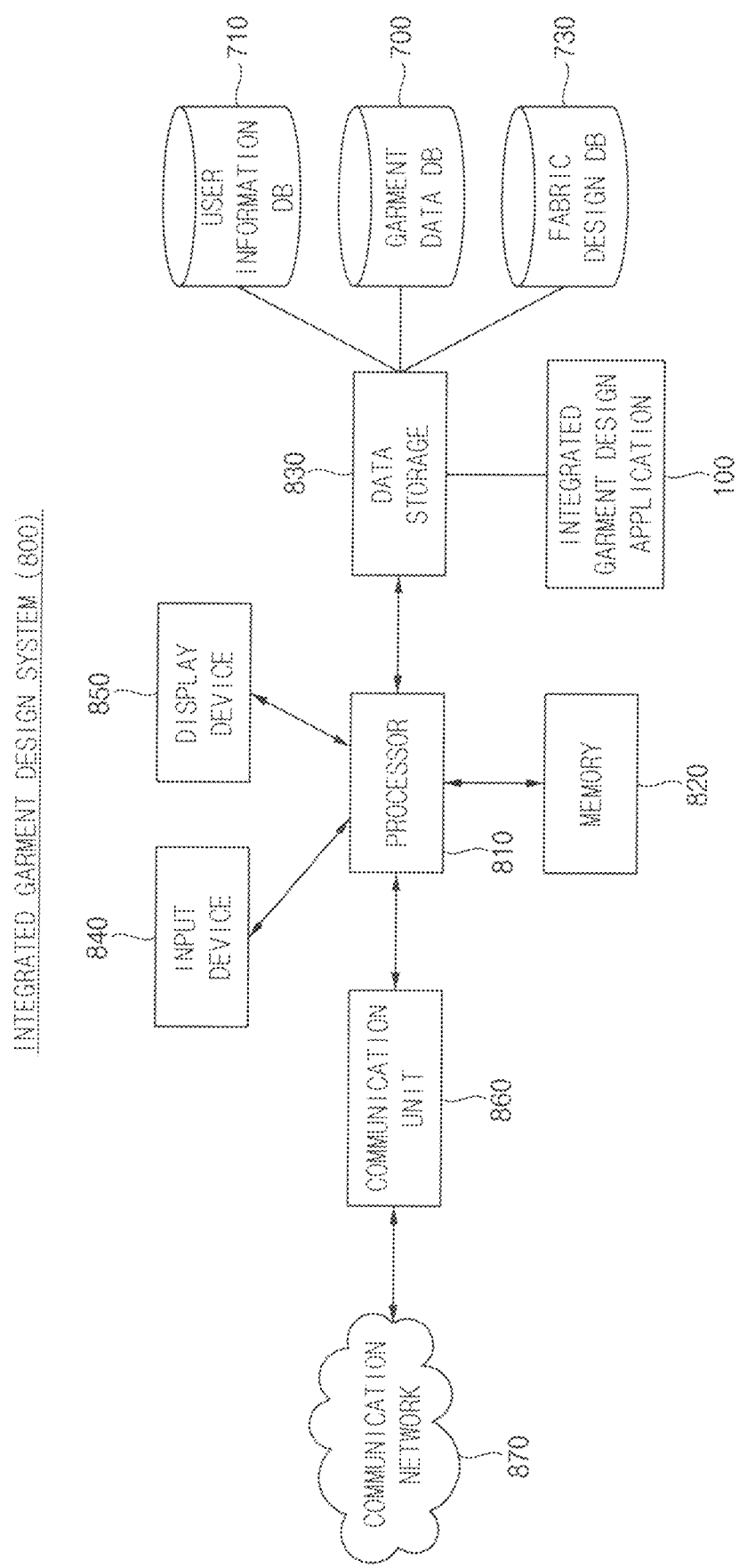
FIG. 2 shows a configuration of a computer device for running the integrated garment design application program of FIG. 1.

FIG. 2 illustrates the configuration of an integrated garment design system 800 for executing the integrated garment design application program 100 of FIG. 1.

Referring to FIG. 2, the integrated garment design system 800 may be implemented in a form in which the integrated garment design application program 100 is combined with the hardware of the computer device. The integrated garment design system 800 may execute a program, and may provide a function for storing and managing pre-processing data and post-processing data. The integrated garment design system 800 may communicate with the outside devices, and may further provide functions such as supporting interactive interaction with a user.

According to an exemplary embodiment, the integrated garment design system 800 may include a hardware configuration provided by a general-purposed computer device. For example, the integrated garment design system 800 includes a memory device 820, a data storage 830, an input device 840, a display device 850, a communication unit 860, the processor 810, and the like.

The processor 810 may be, for example, a central processing unit (CPU), a controller, an arithmetic logic unit (ALU), a digital signal processor, a microcomputer, a field programmable array (FPA), a programmable logic unit (PLU), a microprocessor, or any other device capable of executing instructions and responding to requests. The processor 810 may be implemented using one or more general purpose computers or special purpose computers. The processor 810 may execute an operating system (OS) and the execution file of one or more application programs executed on the operating system. In addition, the processor 810 may access, store, manipulate, process, and generate data in response to the execution of the program. For convenience of understanding, although it has been described above that one processor is used in some cases, it can be seen that those of ordinary skill in the art will recognize that the processor 810 may include a plurality of processing elements and/or a plurality types of processing elements. For example, the processor 810 may include a plurality of processors, or one processor and one controller. Other processing configurations are also possible, such as parallel processors.

The execution file of the integrated garment design application program 100 may include instruction codes. The instruction codes may work the processor 810 to operate as desired or, independently or collectively instruct the processor 810. The execution file of the integrated garment design application program 100 and the data related to the present invention to be described later may be stored in the data storage 830 configured as a computer-readable storage medium to be interpreted by the processor 810 or to provide instructions or data to the processor 810. The processor 810 may load the execution file and execute the command codes of the execution file while utilizing the memory 820 as a workspace. In the process of executing the command codes, the user's instructions or data may be input, and the execution result of the instruction codes processed by the processor 810 may be output through an output device such as the display device 850. The processor 810 may communicate with an external computing device (not shown) through the communication unit 860 such as a modem and a communication network 870, if necessary.

The data storage 830 may store data to be non-volatile or non-transitory. The data storage 830 may store various types of data, such as garment design-related data, user information, fabric design data, and the like. In an exemplary embodiment, these data may be stored and managed in the form of databases 700a, 710a, and 730a. The integrated garment design application program 100 and the data may be stored in the data storage 830, which may be an auxiliary storage device built into a part of the computer device as shown, or may be distributed and stored in a data storage device of an external computer system connected through the communication network 870. The data storage 830 may be implemented as, for example, non-volatile storage devices such as a hard disk driver or a solid state drive (SSD), etc.

Figure 3:
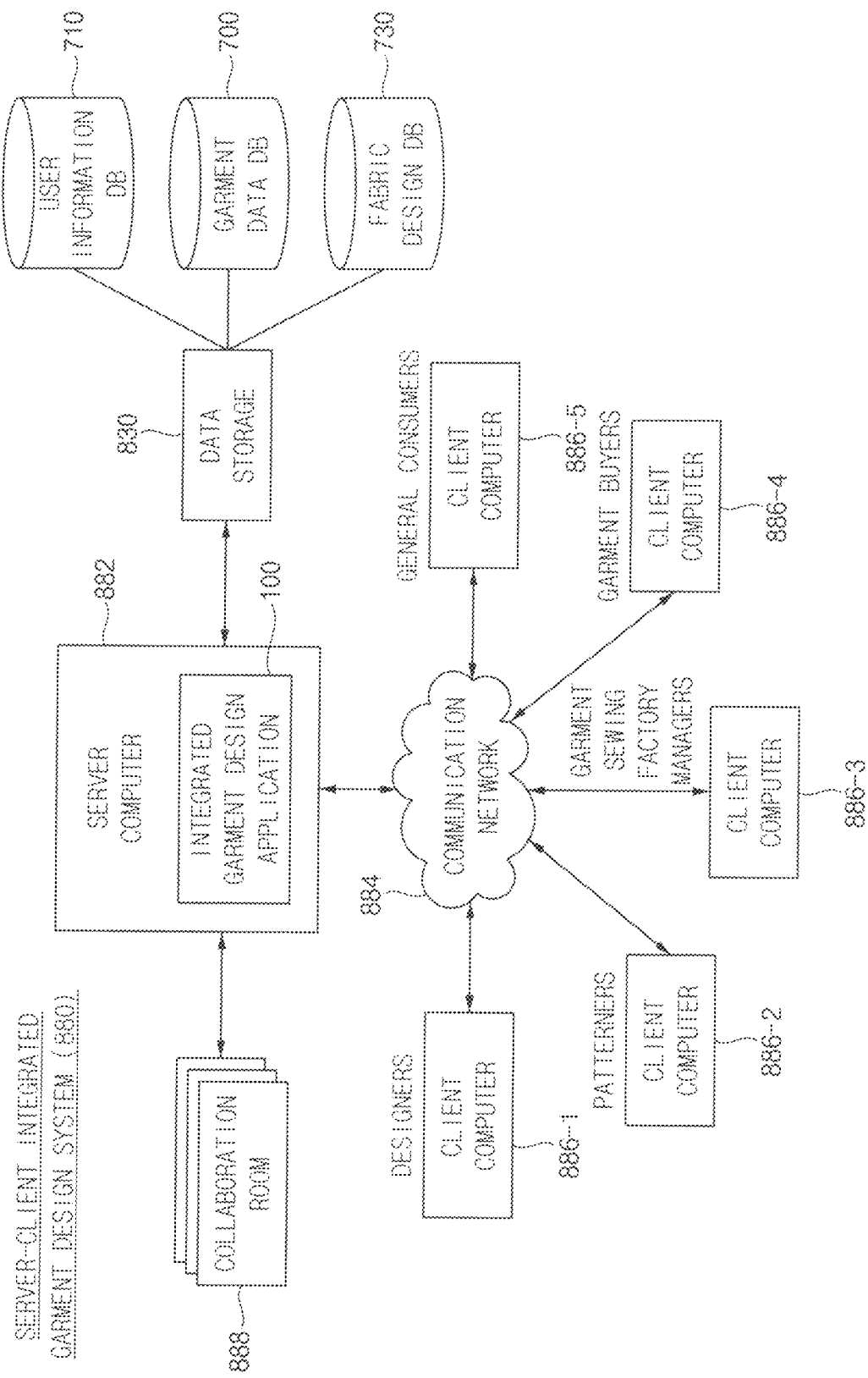
FIG. 3 schematically illustrates a configuration of a server-client integrated garment design system according to an exemplary embodiment of the present invention.

FIG. 3 schematically illustrates a configuration of a server-client integrated garment design system 880 in accordance with an exemplary embodiment of the present invention.

Referring to FIG. 3, the server-client system integrated garment design system 880 may include a server computer 882 and a plurality of client computers 886-1, 886-2, 886-3, 886-4, and 886-5 each of which is connected to the server computer 882 through a communication network 884 to receive services provided by the server computer 882. The hardware resources of the server computer 882 may be substantially the same as the hardware resources of the integrated garment design system 800 shown in FIG. 2. That is, the server computer 882 may include a computer device and communication equipment configured to serve as a server, and the data storage 830 capable of non-volatile or non-transitory storage of data. By using the storage space of the data storage 830, several databases such as the garment database in the garment data storage/management unit 700, the textile design database in the textile design data storage 730, the user information database in the user information storage 710 and the like may be built. The server computer 882 may include an execution file of the integrated garment design application program 100.

The server computer 882 may run the execution file of the integrated garment design application program 100, to provide the client computers 886-1 to 886-5 with the functions of the application program 100. The execution file of the integrated garment design application program 100 may cooperate with the server computer 882 to provide an integrated garment design platform. Various related parties such as designers, patterners, sewing factory managers, garment buyers (orderers), who are engaged in the apparel industry, and garment consumers can access the server computer 882 using the client computers 886-1 to 886-5 and use a number of functions provided by the execution file of the integrated garment design application program 100. That is, the processor of any one of the client computers 886-1 to 886-5 may connect to the processor of the server computer 882 to make a predetermined request, and the processor of the server computer 882 can provide a response to the processor of the any one of the client computers 886-1 to 886-5 in response to the request. The response contents of the server computer 882 may be displayed on the display devices of the client computers 886-1 to 886-5.

The integrated garment design application program 100 may allow the parties concerned to create a collaboration room 888 in a virtual space when needed. That is, the parties involved create the collaboration room 888 using their client computers 886-1 to 886-5, enter the collaboration room 888 together, and perform tasks related to ordering, designing, and producing the garment. This can be done in the form of collaboration.

With reference to FIGS. 1 to 3, the functions and processing contents of the integrated garment design application program 100 will be described in more detail.

In an exemplary embodiment, the garment flat sketch maker 200 may include a flat sketch production unit 210. The flat sketch production unit 210 may provide a flat sketch creation tool. The user (e.g., a garment designer) may edit a garment flat sketch by using the flat sketch creation tool or by loading the garment flat sketch from the garment data storage & management unit 700. In addition, the flat sketch production unit 210 may provide a flat sketch upload function that enables the garment flat sketch data created and/or edited to be uploaded for storage to the garment data storage & management unit 700.

In an exemplary embodiment, the garment flat sketch maker 200 may further include a flat sketch search unit 220. The flat sketch search unit 220 may search a garment flat sketch desired by the user from the garment data storage & management unit 700. The flat sketch search unit 220 may transmit an arbitrary garment image input by the user to the garment data storage & management unit 700 to request a similar flat sketch search. In response, the garment data storage & management unit 700 may return a search result to the flat sketch search unit 220 by searching for flat sketch data similar to the garment image among the garment flat sketches stored in the data storage 830. The flat sketch search unit 220 may receive the garment flat sketch provided by the garment data storage & management unit 700 as a search result and display it in an editable manner. The user may perform subsequent tasks such as editing the garment flat sketch using the flat sketch production unit 210.

In an exemplary embodiment, the flat sketch production unit 210 may further provide a color/image tool. The color/image tool may provide several functions that enable filling the area inside the border of the garment flat sketch image with a desired color and/or graphic image, and adjusting the transparency of the color, the size and angle of the graphic image, and whether to repeat it as desired. In an exemplary embodiment, the garment flat sketch produced by the flat sketch production unit 210 may include a plurality of vector images. Each vector image may include a plurality of points and a line connecting the plurality of points. The line may include a straight line or a spline curve. The flat sketch production unit 210 may express the garment flat sketch as structured image data using points and lines.

In an exemplary embodiment, the flat sketch production unit 210 may provide a grouping tool. The grouping tool may create a flat sketch group by grouping several flat sketches and make a request to the garment data storage & management unit 700 to register the flat sketch group.

The flat sketch production unit 210 may provide a coupling reference point specifying tool. The coupling reference point specifying tool may provide a function for specifying a coupling reference point as a reference when coupling a single garment flat sketch or a group of garment flat sketches with other garment flat sketches. Garment flat sketches with the coupling reference point specified can be automatically combined by using the coupling reference point. That is, a plurality of garment flat sketches are coupled by overlapping the coupling reference points of the plurality of garment flat sketches through adjustment of the garment flat sketch size and angle.

On the other hand, in an exemplary embodiment, the parametric garment pattern maker 400 may include a parametric pattern making unit 410 configured to produce a garment pattern in a parametric design method, and a work order production unit 420 capable of making a work order sheet for the created garment pattern.

In an exemplary embodiment, the parametric pattern-making unit 410 may provide a pattern creation tool unit. This pattern creation tool unit may provide the function for users (e.g., patterners) to create parametric garment patterns by defining points and lines that produce pattern geometry in a parametric design way. In addition, the pattern creation tool unit may provide a function to set the sewing condition information and arrangement condition information of the garment patterns. The sewing condition information may include information that determines which lines of the created parametric garment patterns should be sewn to each other (seam lines), that is, which lines of the garment patterns should be sewn to each other. The arrangement condition information may include arrangement information that determines where and how parametric garment patterns are to be arranged in each 3D human body model when draping simulation is performed on the 3D human body model.

In an exemplary embodiment, the parametric pattern making unit 410 may provide a function to search for a garment flat sketch desired by a user (e.g., patterners) from the garment flat sketches stored in the garment data storage & management unit 700. The parametric pattern making unit 410 may receive the garment flat sketch requested by the user from the garment data storage & management unit 700 and display it on the screen of the display device 850. The user can make parametric garment patterns corresponding to the garment flat sketch by utilizing the remaining area of the screen with reference to a predetermined garment flat sketch displayed on a partial area of the display screen.

In addition, in an exemplary embodiment, the parametric pattern making unit 410 may provide a 'flat sketch-pattern' link function that enable a pattern equation of a created parametric garment pattern to have a correlation with the corresponding garment and a predetermined garment flat sketch. By the flat sketch-pattern link function, the parametric garment pattern can be stored in the garment data storage & management unit 700 to be linked with the corresponding garment flat sketch data.

In an exemplary embodiment, the parametric pattern making unit 410 may provide a size/parameter list creation tool. The user may use this tool to create a list of body sizes including sizes for each body part (e.g., height, chest circumference, waist circumference, leg length, arm length, etc.) required to create a new pattern. In addition, the user may create a new parameter (e.g., parameter x=chest circumference/4) by using a desired body part size among the body part sizes listed in the body size list as a parameter. For example, the new parameter may be defined by including a desired body part size among the body part sizes as a parameter. The newly created parameters may be used by including them in the parameter list.

The parametric pattern-making unit 410 may further include a pattern area setting tool. The pattern area setting tool allows the user to define the basic size of the pattern area to create a garment pattern by using the body size listed in the body size list as a parameter. In this way, if the size of the pattern area is defined using specific human body sizes such as height, chest circumference, waist circumference, leg length, arm length, etc. as parameters, there is an advantage. That is, when the human body size is changed later, a new pattern changed in response to the changed size may be automatically created.

In an exemplary embodiment, the pattern creation tool unit of the parametric pattern making unit 410 may have a pattern area having a local coordinate system, and provide the ability for a user to create a desired garment pattern based on the origin of that local coordinate system. The pattern creation tool unit may provide the ability to create sequentially a number of points that define the shape of a garment pattern. The pattern creation tool unit may provide the ability to use previously created points as parameters when creating new points defining a garment pattern. That is, the position of a point to be newly created may be determined by defining a predetermined geometric relationship with the existing point(s) used as the parameter. The predetermined geometric relationship may be expressed as a relational expression including the position of the previously created point as a parameter.

Let's consider that points defining the shape of a pattern are created in the parametric design method in this way. In this case, when the position of a first point, which is any one of the points, is changed by a first adjustment amount, other points that are created after the first point and whose positions are defined by a parametric equation including the first point as a parameter may be changed in series according to the position adjustment amount (the first adjustment amount) of the first point and the predetermined geometric relationship. For example, the position of a second point may be set to a point moved by 15 mm in the X-axis direction from the position of the first point. In addition, the position of a third point may be set as a point rotated in a 45 degree clockwise direction from the position of the second point. The position of the second point is defined by including the position of the first point as a parameter, and the position of the third point is defined by including the positions of the first and second points as parameters. If the position of the first point is changed to modify the shape of the pattern, the positions of the second and third points including the position of the first point as a parameter are also automatically changed.

In an exemplary embodiment, the pattern creation tool unit may provide a function for creating points constituting a pattern in several ways: (i) creating a single point by inputting absolute coordinates; (ii) selecting a point and creating a new point by specifying the amount of movement (distance and direction of movement) from that point; (iii) selecting two points to create a point that internalizes or externalizes them; (iv) select two points and rotate any one point at a desired angle based on the other point; (v) creating a new point at a position moved from a position of any one point by a desired distance in the vertical or horizontal direction with respect to the line connecting any two other points, (vi) creating a new point at the intersection of the perpendicular to the line connecting two other points from one point (vii) creating a new point at the intersection of four points, i.e., the intersection of a line connecting two points and a line connecting two other points, and (viii) when rotating one point with respect to another, creating a new point at the point where the rotating one point meets a line connecting two other points.

In an exemplary embodiment, the pattern creation tool unit may provide a function of setting sewing conditions by specifying line segments to be sewn with each other among a plurality of patterns, and a function of setting arrangement condition information regarding which pattern should be arranged in which position and in what form with respect to a 3D human body model to be draped simulation. In setting sewing conditions, the same sewing line number may be assigned to the lines to be sewn together between the target patterns to be sewn and displayed on the screen.

In an exemplary embodiment, the pattern creation tool unit may provide a function of modifying, in other word, increasing or decreasing the width and/or length of a specific portion of the pattern by specifying desired points on the pattern and moving their positions.

In an exemplary embodiment, the pattern creation tool unit may provide a function of duplicating a desired pattern so as to be applied to a 3D drape simulation, and a function of creating a symmetrical pattern by symmetricizing a desired pattern around a predetermined reference line.

In an exemplary embodiment, the work order production unit 420 may load the desired garment flat sketch from the garment data storage & management unit 700 and deliver it to the parametric pattern production unit 410. The work order production unit 420 may provide a tool capable of creating a work order for the parametric garment patterns created by the parametric pattern production unit 410. The user may create a work order by using the work order creation tool. The work order production unit 420 may provide the work order made by the user to the garment data storage & management unit 700 by linking the work order with the corresponding parametric garment pattern equation or the corresponding garment.

On the other hand, in an exemplary embodiment, the 3D garment drape simulator 600 may read the pattern equation of predetermined parametric garment patterns in which sewing conditions are specified from the garment data storage & management unit 700. In addition, the 3D garment drape simulator 600 may virtually sew the read predetermined parametric garment patterns according to the sewing condition and arrangement condition information and automatically apply the virtually sewn garment to the 3D human body model. Furthermore, the 3D garment drape simulator 600 may be configured to display, on the screen of the computer device, a state in which the 3D human body model is wearing the virtual garment that is made by virtually sewing the parametric garment patterns.

In an exemplary embodiment, the 3D garment drape simulator 600 may include a human body model generation module 610, a 3D simulation module 620, and a parametric pattern generator 640.

The human body model generation module 610 may make a 3D human body model in advance and store it in, for example, the data storage 830. The 3D human body model may include at least one model to which standard (basic) body sizes are applied to male and female genders, respectively. A barrel-shaped body part bounding surface which surrounds each of the body parts of the 3D human body model may be set for each body part (head, neck, torso, pelvis, left arm, right arm, left leg, right leg, left hand, right hand, left foot, right foot, etc.) of the 3D human body model.

When creating a parametric garment pattern, the arrangement conditions for each garment pattern may be specified. The arrangement condition information may include information on a pattern reference point used as a reference when the parametric garment pattern is placed on the 3D human body model, and boundary surface information on which body part boundary surface of the 3D human body model the pattern reference point should be placed. In a 3D garment drape simulation, parametric patterns may be placed on a specified body part boundary surface. In an exemplary embodiment, the human body model generation module 610 may generate a 3D human body model modified by reflecting the body size input by the user. When the body size is changed to a size other than the standard (basic) size, the human body model generation module 610 may change the size and shape of the 3D human body model and the size of the boundary surface of each body part in conjunction with the changed body size.

In an exemplary embodiment, the parametric pattern generator 640 may have substantially the same functionality as the parametric garment pattern maker 400. The parametric pattern generator 640 may load the desired parametric pattern equation from among the parametric pattern equations stored in the data storage 830 through the garment data storage & management unit 700. The parametric pattern generator 640 may graphically express the pattern on the screen of the display device 850 of the computer device by using the loaded pattern equation.

The parametric pattern generator 640 may receive the searched garment information provided from the flat sketch search unit 220. This garment information may be information on garment corresponding to the similar flat sketch provided by the flat sketch search unit 220 as a search result from the garment data storage & management unit 700. The garment information may include garment identification information. The parametric pattern generator 640 may call a pattern equation linked to the garment information from the garment data storage & management unit 700 using the searched garment information.

The 3D simulation module 620 may receive the 3D human body model created by the human body model generation module 610 as an input. In addition, the parametric pattern generator 640 may receive parametric garment patterns corresponding to the fetched parametric pattern equation. The 3D simulation module 620 may apply the received garment patterns to the received 3D human body model. That is, the garment obtained by sewing the patterns virtually may be put on the 3D human body model.

Specifically, the parametric garment patterns may be arranged on a body part boundary surface that is predefined in the 3D human body model. As mentioned above, each parametric garment pattern may have arrangement condition information that determines on which body part on the 3D human body model the garment pattern should be placed. In the parametric garment pattern, one or more pattern reference points serving as a reference may be set as the arrangement information when placed on a 3D human body model. In addition, one or more boundary surface reference points serving as a reference when a parametric pattern is disposed may be specified on the boundary surface of each body part of the 3D human body model. The 3D simulation module 620 may place each parametric garment pattern on a body part boundary surface set in the arrangement condition information in response to an instruction to place the parametric patterns on the 3D human body model. At this time, the pattern reference point of each parametric garment pattern is superimposed on the boundary surface reference point of the body part boundary surface. Based on the seam line information displayed on each of the parametric garment patterns, the parametric garment patterns to be sewn to each other may be sewn automatically and virtually. In addition, the virtually sewn patterns may be expressed by being combined with each other on the boundary surface of the corresponding body part of the 3D human body model.

In an exemplary embodiment, the 3D garment drape simulator 600 may further include a 3D display/collaboration unit 630, and a pattern modification information learning module 650.

In an exemplary embodiment, the 3D display/collaboration unit 630 may provide a tool that allows various parties involved in the design and production of the garment to participate together to collaborate and exchange opinions on pattern modification. That is, the 3D display/collaboration unit 630 may provide a function to communicate between the parties involved in the design of the garment. Relevant parties may access the 3D garment drape simulator 600 of the server computer 882 via the respective client computers 886-1, 886-2, . . . , 886-5 and use the function of the 3D display/collaboration unit 630. The 3D drape simulation image created by the 3D simulation module 620 may be provided to the client computers 886-1, 886-2, . . . , 886-5 to be displayed on a garment display window. The parametric garment pattern provided by the parametric pattern generator 640 may also be displayed on the garment display window. These functions enable relevant parties to share 3D drape simulation results and/or parametric garment patterns.

In addition, in response to the request of the relevant parties, the 3D display/collaboration unit 630 may create the collaboration room 888. The 3D display/collaboration unit 630 may provide a tool that allows the relevant parties to exchange opinions in the collaboration room 888 while viewing the 3D drape simulation result and/or the parametric garment pattern together, edit or modify the pattern shape, the degree of basting, the type of garment colors, etc. and check them right away. For example, the 3D display/collaboration unit 630 may provide a tool that can allow the user to access the fabric design data storage 730, and select a desired fabric pattern and/or color information to be applied to a desired pattern part. Through this collaborative process, modifications to the pattern may be determined.

In an exemplary embodiment, the 3D simulation module 620 may provide a function of distinguishably displaying the amount of strain applied to each part of the garment applied to the 3D human body model in which the parametric patterns are sewn. For example, the color may be displayed differently according to the magnitude of the strain applied to each part of the garment on the 3D drape simulation image.

In an exemplary embodiment, the 3D simulation module 620 may provide a function of distinguishably displaying the size of a gap between the garment applied to the 3D human body model, in which parametric patterns are sewn virtually, and the corresponding body part of the 3D human body model.

The 3D display/collaboration unit 630 may provide information such as a garment shape, a pattern, and a work order sheet determined through collaboration to the computer device 740 of a factory that will produce the corresponding garment. The garment manufacturing factory may review various pieces of information provided from the 3D display/collaboration unit 630 and present an opinion for a necessary revision opinion from the standpoint of the garment producer. The revision opinion may be provided to the pattern modification information learning module 650 through the computer device 740 of the manufacturing factory. In addition, the 3D display/collaboration unit 630 may provide a 3D simulation result of garment determined through collaboration, related work order sheets, etc. to the garment data storage & management unit 700. The garment data storage & management unit 700 stores the provided 3D simulation result of the garment, associated work order sheets, etc. in correlation with the flat sketch, pattern equation, and the like of the corresponding garment.

In an exemplary embodiment, the pattern modification information learning module 650 may receive a modification opinion regarding the pattern determined with the 3D display/collaboration unit 630. The pattern modification information learning module 650 may also receive a pattern modification opinion from the factory computer 740 for corresponding garment. The pattern modification information learning module 650 may use the received opinions on various pattern modifications as input information, and generate pattern modification information based on a pre-trained pattern modification information learning model.

In an exemplary embodiment, the garment data storage & management unit 700 may store and manage design data related to a plurality of garments. Here, the design data related to the garments may be a work result generated by the garment flat sketch maker 200, the parametric garment pattern maker 400, and the 3D garment drape simulator 600 for designing garments. For example, garment flat sketches (2D design) created by the garment flat sketch maker 200, parametric pattern equations related to parametric garment patterns created by the parametric garment pattern maker 400, and 3D drape simulation results obtained by applying the patterns to the human body model and virtually sewing them, work order sheets to be provided to manufacturing factories to produce the corresponding garment, etc. may be stored and managed in the garment data storage & management unit 700.

The garment data storage & management unit 700 may be implemented with hardware, such as a data storage device that provides a physical storage space for data storage, and a data storage/management module. The data storage device may be, for example, a nonvolatile storage device capable of retaining data even when power is turned off, such as a hard disk drive or a solid state drive (SSD). The data storage/management module may be implemented as an application program. The data storage/management module stores and manages data related to garments, such as flat sketches, parametric patterns, 3D simulations, and work orders for garment sewing work, in the storage device for each garment to be correlated with each other. In addition, functions such as searching for stored data and providing search results in response to a search request from the outside may be provided. The data storage/management module may store and manage the data in a database structure.

In an exemplary embodiment, in storing and managing the design data related to the garments, the corresponding garment flat sketch data, parametric pattern equation data, work order data, 3D drape simulation data, etc. may be stored and managed so as to be linked to each other for each individual garment. The flat sketch data, pattern equation data, work order data, 3D drape simulation data, work order data, etc. may be linked to each other in a one-to-one relationship, a one-to-many relationship, or a many-to-many relationship. For example, one parametric pattern and one 3D drape simulation result may be created from one flat sketch data. These data may be linked to each other in a one-to-one relationship. As another example, a plurality of parametric patterns and a plurality of 3D drape simulation results may be created from one flat sketch data. In this case, the flat sketch data may be linked with the parametric pattern data, and the simulation result in a one-to-many relationship. There may be a plurality of flat sketch data related to one garment, and there may be a plurality of parametric pattern data and 3D simulation result data. In this case, these data may be linked in a many-to-many relationship.

As one method for imparting linkage between the data, unique identification information that can distinguish each individual garment from other garments may be given to each individual garment. Flat sketch data, parametric pattern data, work order data, 3D drape simulation data, etc. related to the garments may be stored and managed in linkage with each other through the identification information of the garments. According to this, if any one type of data (e.g., the flat sketch data) is specified, the identification information of garment connected to the data can be known, and further, other types of data (e.g., the parametric pattern data, etc.) connected to the identification information can be searched.

As another method, each time the flat sketch data, parametric pattern equation data, 3D drape simulation data, work order data, etc. are created, unique identification information may be given to each, and the linkage (relationship) between these data can be defined using the identification information of each data. The identification information of each data and the information on the correlation between the data may be collectively managed in, for example, a separate table (hereinafter, referred to as a linkage management table). According to this, when one type of data (e.g., flat sketch data) is specified, it is possible to search other types of data (e.g., parametric pattern equation) having other identification information which is linked to identification information of the specified data in the linkage management table.

By using the linkage information between the flat sketch data, parametric pattern equation data, work order data, 3D drape simulation data, and work order data in this way, the garment flat sketch maker 200, the parametric garment pattern maker 400, and the 3D garment drape simulator 600 can share the work results made by themselves so that they can perform mutually associated works efficiently.

The garment flat sketch data may be provided by the garment flat sketch maker 200. The pattern equation and work order data of the parametric pattern may be provided by the parametric garment pattern maker 400, and may be also provided by the 3D garment drape simulator 600. The garment data storage & management unit 700 may also store and manage data such as a 3D drape simulation result obtained by applying the parametric garment patterns to the 3D human body model to be virtually sewn and final work orders. These data may also be stored and managed while being linked with each other, such as garment flat sketches, parametric pattern equations, and work orders for the corresponding garment.

In addition, the garment data storage & management unit 700 may be configured to perform a search in response to a search request from the outside for the stored data and provide a search result. In an exemplary embodiment, in response to the search request from the flat sketch search unit 220, the garment data storage & management unit 700 may find a garment flat sketch similar to the garment image provided by the flat sketch search unit 220 from the stored garment flat sketches to provide to the flat sketch search unit 220. For accurate and effective retrieval of similar garment flat sketches, it is possible to build and use a similar flat sketch discrimination model trained in advance by a deep learning technology. In response to the request from the parametric garment pattern maker 400, the garment data storage & management unit 700 may provide the flat sketch data requested by the parametric garment pattern maker 400 from the stored flat sketch data. In addition, in response to the request from the parametric pattern generator 640, the garment data storage & management unit 700 can provide the requested parametric pattern equation.

A large amount of data may be accumulated and managed in the garment data storage & management unit 700. In an exemplary embodiment, when the amount of garment flat sketch data, parametric pattern equation data, and work order data to be stored and managed increases, they may be managed cumulatively by using a database management system (DBMS) for efficient data management. In particular, since it is necessary to store and manage the garment flat sketch data, the parametric pattern equation, and the work order data in linkage with each other for each garment, it may be efficient to store and manage the data in a relational DBMS. The accumulated garment design-related data may be effectively used to design other garments later.

As mentioned above, the garment flat sketch, parametric pattern equation, work order, and 3D drape simulation result for one garment may be stored in the garment data storage & management unit 700 while having a linkage with each other. The garment flat sketch maker 200, the parametric garment pattern maker 400, the 3D garment drape simulator 600, etc. can not only share the data stored in the garment data storage & management unit 700, but also utilize the linkage information between the data as needed in a way that other data associated with specific data are loaded therein from the garment data storage & management unit 700 to perform a subsequent operation or a connected operation. For example, the parametric garment pattern maker 400 may load the garment flat sketch data created and stored by the garment flat sketch maker 200 from the garment data storage & management unit 700 to use in the work of creating a garment pattern. The garment pattern may be created by the parametric garment pattern maker 400 in the parametric design method, and the results of the created pattern may be stored in the garment data storage & management unit 700 in the form of a pattern equation. In addition, the 3D garment drape simulator 600 may perform a simulation of trying on a 3D human body model of a desired size by loading parametric pattern equations related to a previously created garment pattern from the garment data storage & management unit 700. Therefore, the overall garment design work can be performed efficiently.

In addition, the integrated garment design application program 100 may also include a user information storage 710 for storing and managing user information, and a fabric design information storage 730 configured to store and manage various fabric patterns and color information, perform a search in response to a search request and provide search results.

The user information storage 710 may store and manage user identification information (ID, password, etc.), group information to which users belong, information about user levels, and the like. Based on this user information, each user can access and use some extent of the data stored in the garment data storage & management unit 700. In addition, it is possible to control whether related work such as modification, etc. is allowed or not.

The fabric design information storage 730 may store and manage various types of fabric information. Information such as patterns and colors of each fabric may be stored and managed. The 3D garment drape simulator 600 may access the fabric design information storage 730 to retrieve desired fabric patterns and colors and apply them to the simulation of the 3D human body model.

Figure 4:
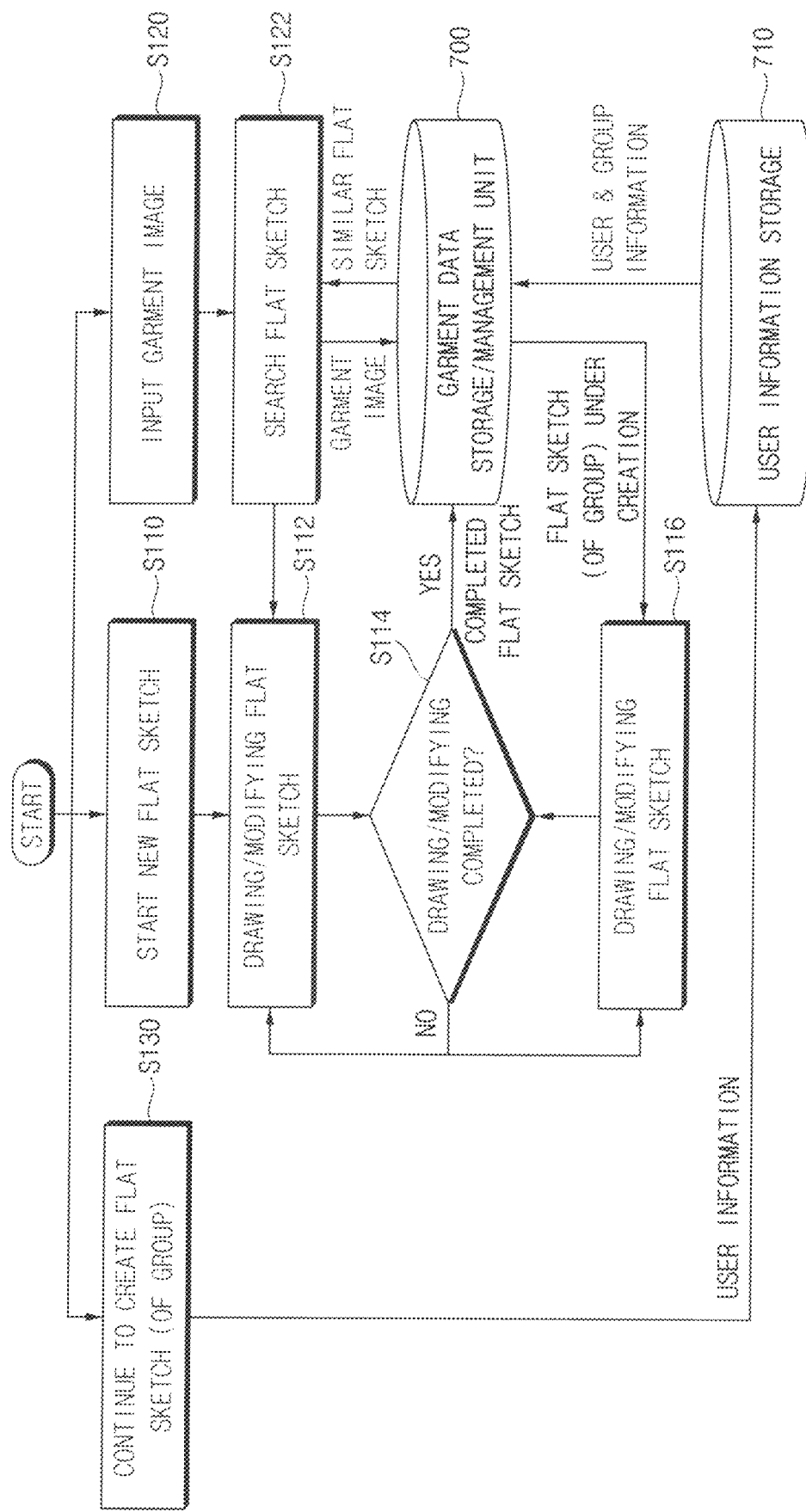
FIG. 4 is a flow chart illustrating a procedure for creating a garment flat sketch using a garment flat sketch maker according to an exemplary embodiment of the present invention.
Figure 5:
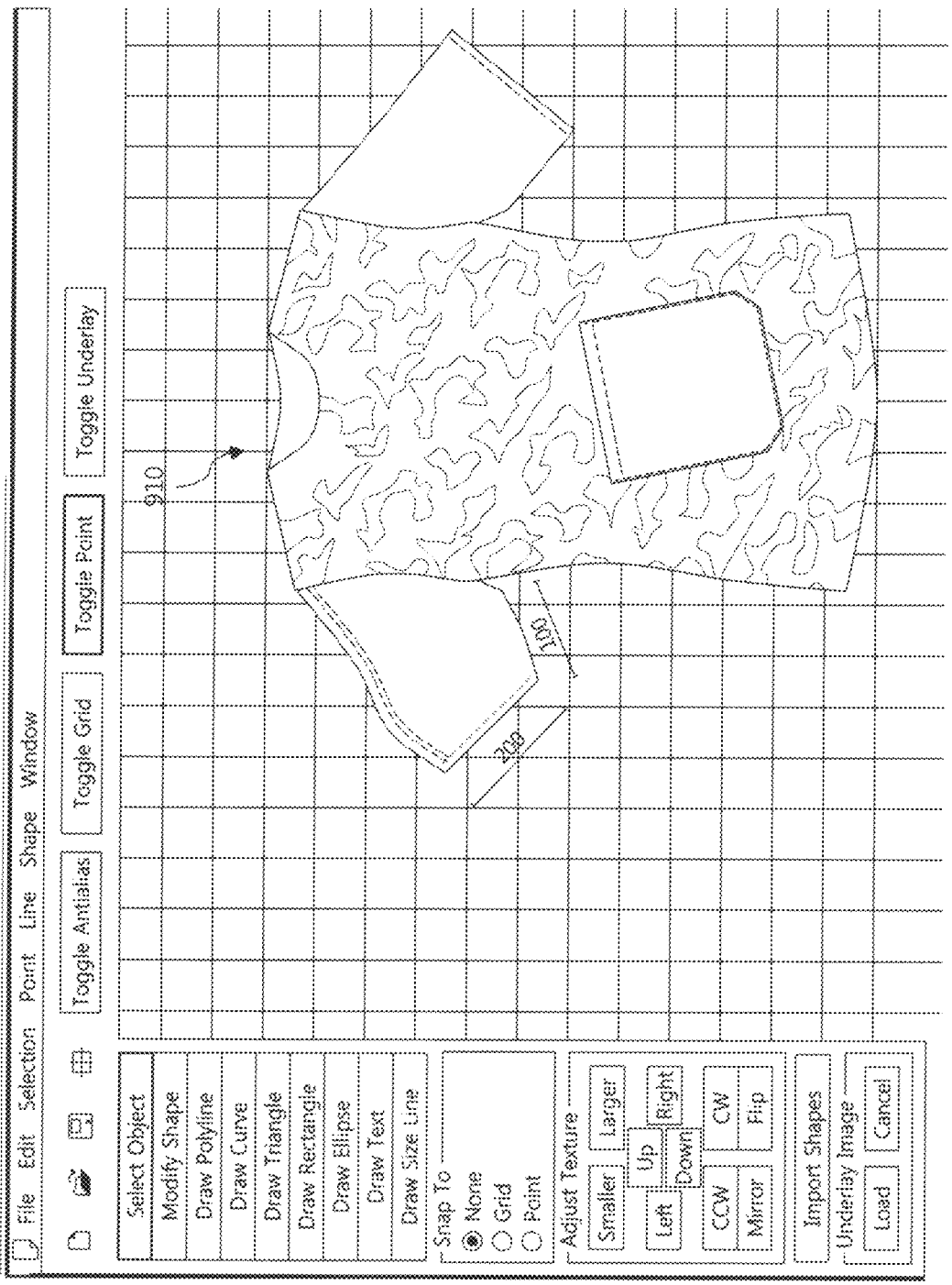
FIG. 5 illustrates a user interface screen of the garment flat sketch maker according to an exemplary embodiment of the present invention.

FIG. 4 is a flowchart illustrating a procedure for creating a garment flat sketch using the garment flat sketch maker 200 in accordance with an exemplary embodiment of the present invention. FIG. 5 illustrates a screen of a user interface 900 of the garment flat sketch maker 200 in accordance with an exemplary embodiment of the present invention.

Referring to FIGS. 4 and 5, garment flat sketch creation may be performed using the garment flat sketch maker 200 module of the integrated garment design application 100. It may be initiated by the user selecting the garment flat sketch maker 200 module to be activated via the input device 840 and giving an execution instruction. The garment flat sketch maker 200 module may be executed by the processor 810 so that the user interface 900 of the garment flat sketch maker 200 as illustrated in FIG. 5 may be displayed on the display device 850.

The user may draw a new garment flat sketch from the beginning using various tools (functions) provided by the user interface 900 (S110, S112). In addition, the user may request the garment data storage & management unit 700 to search for a flat sketch image similar to an input garment image by selecting an image file of a garment as the input garment image (S120). In response, the garment data storage & management unit 700 may search a flat sketch similar to the input garment image and provide the searched one to the user interface 900 (S122). For similar flat sketch retrieval, an image search model built using artificial intelligence may be used. The user may also make modifications to the similar flat sketch image retrieved (S112).

The user interface 900 may provide several tools for drawing or modifying the garment flat sketch 910. A tool (Point) capable of drawing a point, a tool (Line) capable of drawing a line, a tool (Shape) capable of drawing a shape, and the like may be provided. In addition, functions such as selecting and modifying an object, drawing various lines or figures, inputting text, and drawing size lines, etc. may be provided: (select object, modify shape, draw polyline, draw curve, draw triangle, draw rectangle, draw ellipse, draw text, draw size line, etc.).

When the user completes a flat sketch drawing operation or a modification operation using these tools (S114), the user may instruct that the completed flat sketch 910 should be stored. The flat sketch may be stored in the garment data storage & management unit 700 as described above. At the time of storage, it may be stored to have a linkage with the related garments and other data (parametric pattern equation, 3D simulation result, work order, etc.) related to the garments as described above.

Flat sketch creation may be jointly performed by a plurality of users as a group. Users belonging to the same group may share the work result, and any user may perform the subsequent work after receiving the work result performed by other user (S130). For the work of creating a flat sketch of the group, the users may have his or her user information and group information to which he or she belongs to be delivered to the garment data storage & management unit 700 through the user information storage 710. Based on the information, it is possible to draw a new flat sketch of the corresponding group, or to load and modify the flat sketch data being created in the corresponding group.

Figure 6:
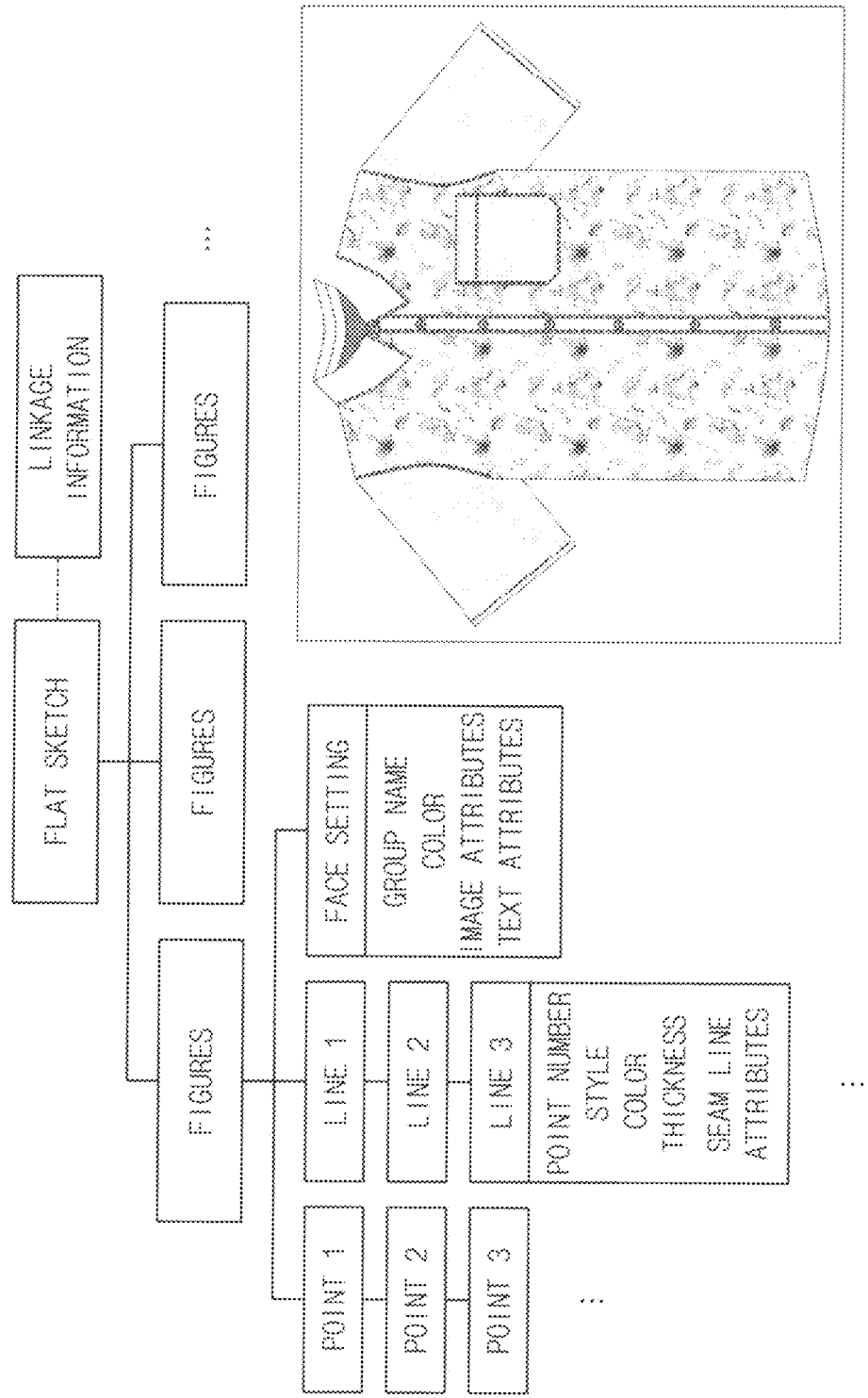
FIG. 6 illustrates a data structure of the garment flat sketch according to an exemplary embodiment of the present invention.

FIG. 6 illustrates the data structure of a garment flat sketch 910 in accordance with an exemplary embodiment of the present invention.

Referring to FIG. 6, the garment flat sketch 910 may include linkage information with flat sketch data and other data (i.e., parametric pattern equation, 3D drape simulated garment, work order, etc.). As described above, the linkage information may include information that can be linked to the garment corresponding to the flat sketch, and/or information that can be linked to data such as parametric pattern equation, 3D drape simulated garment, work order, etc. associated with to the garment.

The flat sketch data may include a plurality of figures. Each figure may include a plurality of points and a plurality of lines, and may include a surface inside a closed curve formed by connecting some or all of the plurality of lines.

The information about each point may include a point number and coordinate information defining a position of the point. The position of the point may be defined in absolute or relative coordinates. The relative coordinates may be defined using geometric information and/or geometric relationships with other points, lines, and surfaces.

The information about each line may include information about number of points constituting the line, style of the line (straight line, curved line, etc.), color of the line, thickness of the line, properties of the seam, and the like.

Information about each face may include the name of the image group to which the face belongs, the color of the face, the properties of the image displayed on the face (image size, origin position, rotation angle, left-right symmetry, vertical symmetry, etc.), information about the properties of the text (name, size, color, etc. of the font), etc. An image group may include a plurality of faces. A group of images may be, for example, for a part of a garment, such as a collar, cuffs, etc., or for the entire garment, such as a t-shirt, pants, or the like.

Figure 7:
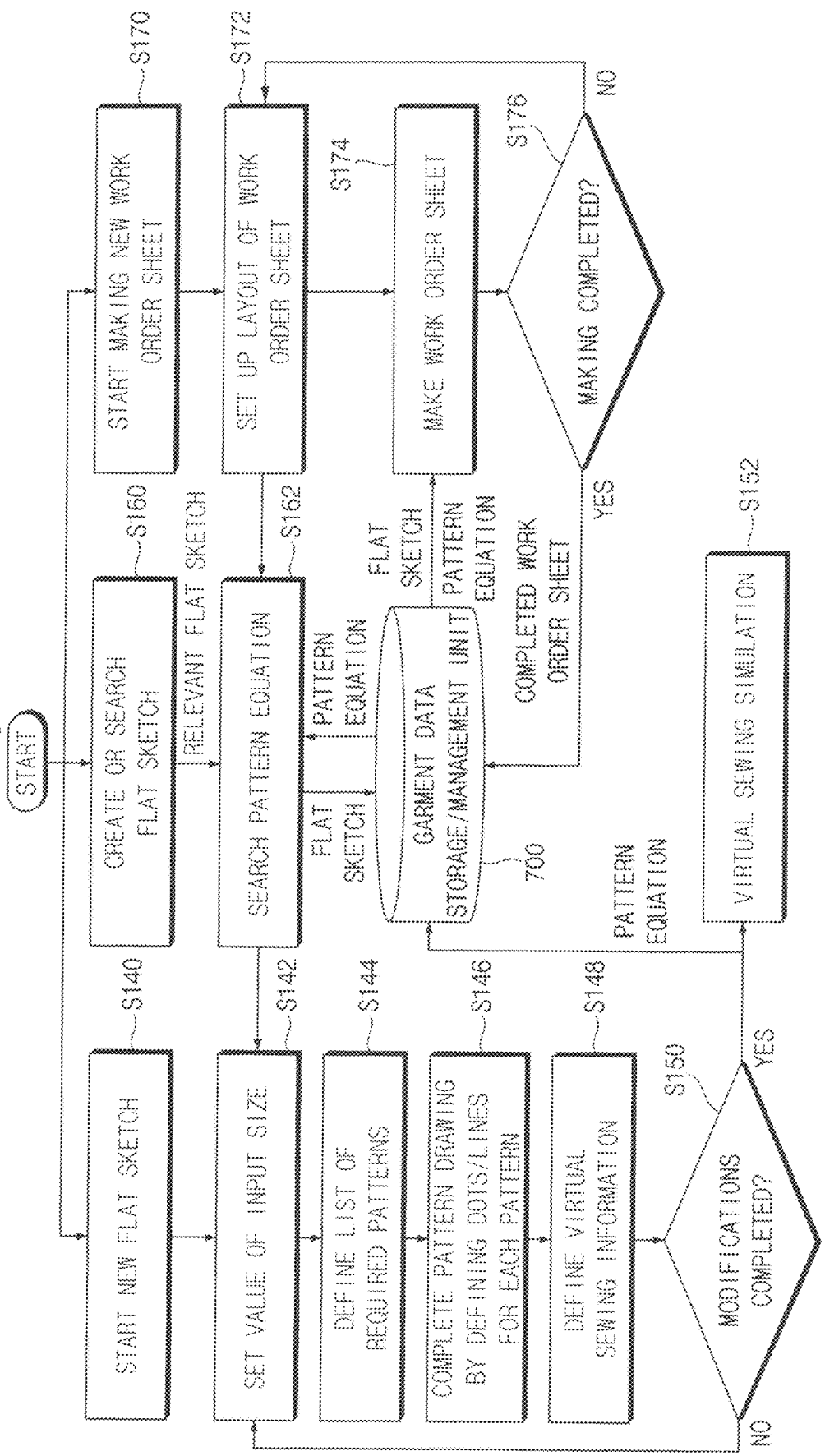
FIG. 7 is a flowchart illustrating a procedure for creating a parametric pattern of a garment using a parametric garment pattern maker according to an exemplary embodiment of the present invention.
Figure 8:
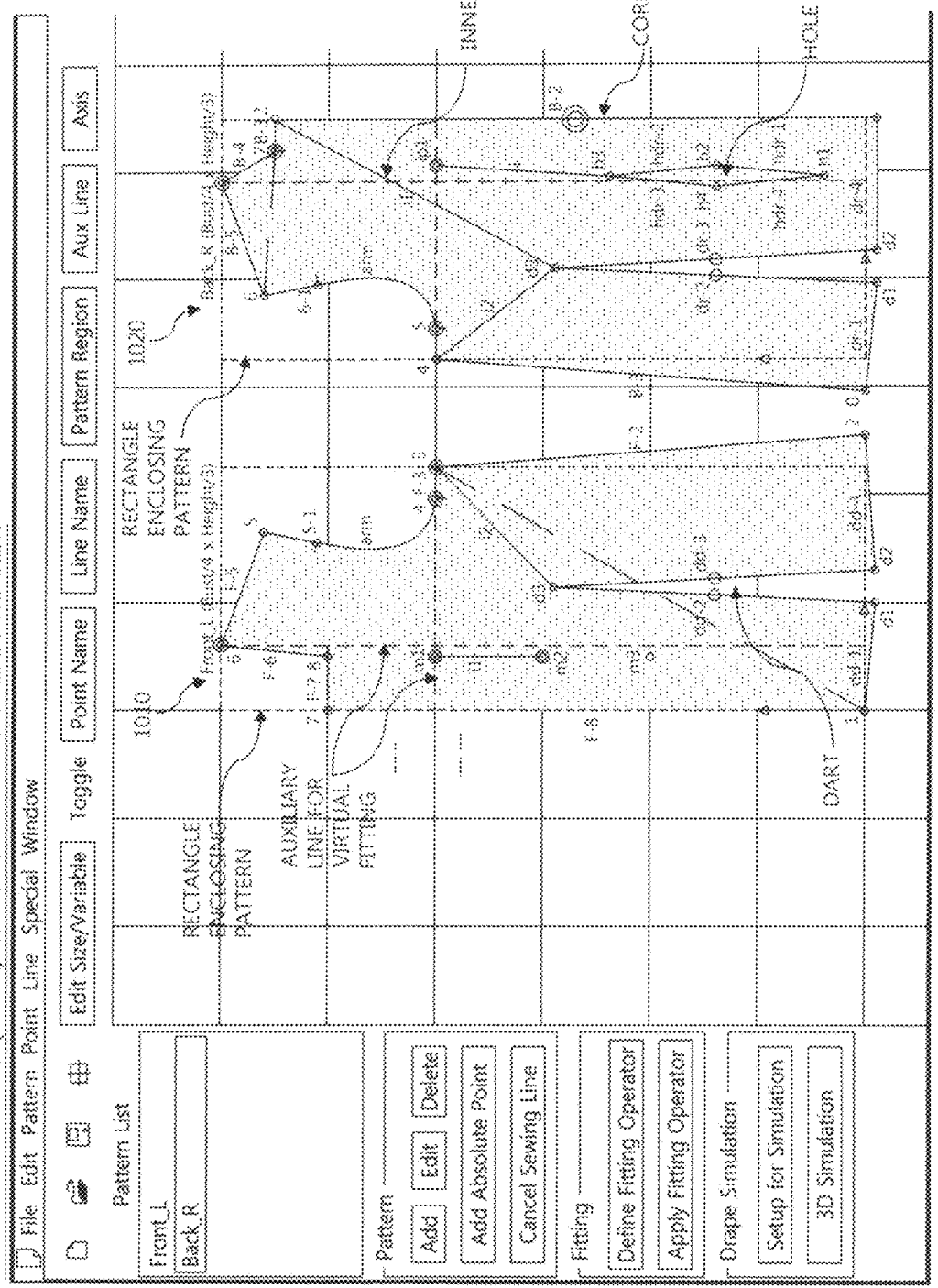
FIG. 8 illustrates a user interface screen of a parametric garment pattern maker according to an exemplary embodiment of the present invention.

FIG. 7 is a flowchart illustrating a procedure for creating a parametric pattern of a garment using the parametric garment pattern maker 400 according to an exemplary embodiment of the present invention. FIG. 8 illustrates a user interface 1000 of the parametric garment pattern maker 400 according to an exemplary embodiment of the present invention.

Referring to FIGS. 7 and 8, creation of the garment pattern may be performed using the parametric garment pattern maker 400. Pattern creation may be started by the user selecting the parametric garment pattern maker 400 module to be activated through the input device 840 and giving an execution instruction. The parametric garment pattern maker 400 module may be executed by the processor 810 to display the user interface 1000 of the parametric garment pattern maker 400 as illustrated in FIG. 8 on the display device 850. The user may create garment patterns in a parametric design manner using various tools (functions) provided by the user interface 1000.

A garment pattern may be newly created or modified by calling a previously created garment pattern. First, the operation of drawing a new garment pattern from scratch will be described. In order to create a new pattern (S140), the user may input the human body size and set values of the input sizes (edit size/parameter), such as defining necessary parameters (S142). The values of input sizes may be set as desired by the user.

Then, it is possible to generate a necessary pattern list (S144). On the screen of the user interface 1000 of FIG. 8, two parametric patterns exemplarily created using the parametric garment pattern maker 400 are shown. One is the pattern (front_L) of the left front part of the top, and the other is the pattern (Back_R) of the right back part.

Figure 9:
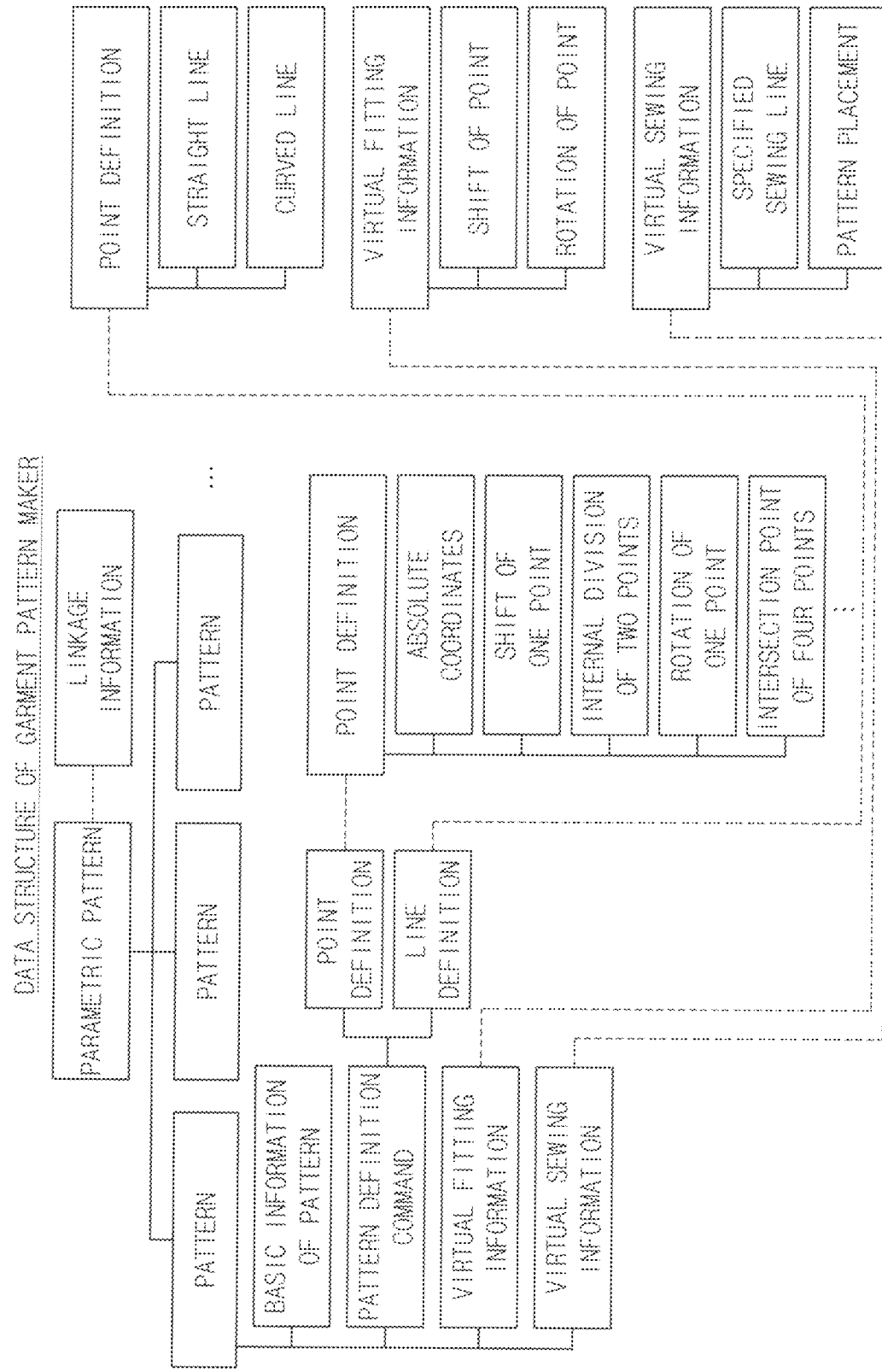
FIG. 9 illustrates a data structure of a parametric garment pattern according to an exemplary embodiment of the present invention.

After the list of patterns to be created is made, users may perform the task of drawing each pattern. Before describing the pattern drawing operation, the data structure of the elements constituting the pattern will be described. FIG. 9 illustrates a data structure of the elements constituting a parametric pattern of a garment according to an exemplary embodiment of the present invention.

Referring to FIG. 9, the parametric pattern may include the linkage information with parametric pattern data and other data (i.e., flat sketch data, 3D simulation garment data, work orders, etc.). As described above, the linkage information may include information that can be linked to the garment corresponding to the parametric pattern, and/or information that can be linked to the garment-related flat sketch data, 3D simulation garment data, work order data, and the like.

Each parametric pattern data may include a plurality of parametric garment patterns 1010, and 1020. Each garment pattern may include basic pattern information, pattern definition command, virtual fitting information, virtual sewing information, and the like.

The basic pattern information may include a pattern name, a basic size of the pattern, and the like. The pattern name may be given arbitrarily. The basic size of the pattern may be defined by the width and height of a rectangle surrounding the pattern. The width and height of the pattern may be defined as predetermined numerical values or may be defined using body size as parameters. For example, in the case of a pattern related to a top, the pattern width may be defined as, for example, 'chest circumference/4', and the pattern height may be defined as, for example, 'height/3'.

The pattern definition command may include definitions of points and lines that are elements to define the shape of the pattern. First, the origin of the pattern may be defined. The points constituting the pattern may be created sequentially in the order of drawing the pattern. For the definition of each point, the position of a new point may be defined by using at least a part of a previously created point or line as a parameter. By defining points in this way, they can have correlation with each other.

The definition of the point may be made in many different forms. For example, a point defined by absolute coordinates, a point defined by the amount of movement from any one point (move), a point obtained by internally dividing the distance between two points by a predetermined division ratio (divide), a point defined by rotation of a predetermined angle based on one point (rotate), an intersection point of four points, that is, a point defined by intersection of a first line segment connecting two points and a second line segment connecting the remaining two points, and the like. In addition, a point may be defined as, for example, a point defined by movement of a predetermined distance in a direction perpendicular to the connecting line of the other two points, a point defined by movement of a predetermined distance in a direction parallel to the connecting line, or a point defined by movement of a predetermined distance from the start or end point of the line connecting the two points. The definition of the line may be made in the form of indicating whether the line is a straight line or a curved line. A pattern created using dots and lines may be defined in the form of a pattern equation and stored in the garment data storage & management unit 700.

The virtual fitting information may include information of positional movement (shift amount) and rotation amount of points constituting the pattern. The virtual sewing information may include specified-sewing line information regarding which line should be sewn between the several patterns to be sewn and pattern arrangement information regarding where and how to arrange the various patterns in a space.

The user may draw a pattern by selecting a desired pattern list based on the data structure of such pattern elements. In an exemplary embodiment, a desired pattern may be created by defining the elements constituting the pattern in a parametric design method (S146).

In an exemplary embodiment, the pattern may be drawn in a way of defining the above pattern elements for each pattern. By defining a point, line, pattern region, various auxiliary lines, and axes for each pattern, a desired pattern can be drawn. Specifically, using the user interface 1000 provided by the parametric garment pattern maker 400 the user may define points constituting a pattern (specifying positions of the points using absolute and relative coordinates) and a line (straight line, curved line) by connecting points. When the generated lines form a closed curve, a surface (region) surrounded by the closed curve forms a pattern region. When the closed curve is formed, a predetermined color may be given to the surface, and a cut line may be automatically generated. In addition, the user may also specify necessary auxiliary lines, darts (to make in three dimensions by folding), internal holes, mirrors (to create another pattern using left-right symmetry), corrugated lines (expanding around the corrugated line), axis lines, etc. The user may perform pattern making tasks until the user draw all the patterns that make up the garment to be made.

Points and lines may be defined in the order in which the pattern is drawn. The basic size of the pattern (width and height of the rectangle surrounding the pattern), parameters arbitrarily defined by the user, location information of previously created points, and relationship with previously created points and/or lines (a number of different geometric relationships as mentioned above such as move, divide, rotate, intersection, etc.) may be used as parameters to define a new point or line. If the points and lines constituting the pattern are defined in a parametric design method using the relationship between the points and/or lines previously created in this way, the basic size of the pattern and user-defined parameters, etc., the points and lines constituting the pattern may be correlated with each other in an organic relationship.

In this way, once a pattern is created in the parametric design method, when any point or line of the pattern is modified, not only the point or line is modified, but also other points or lines including the modified point or line as a parameter may also be automatically modified according to the relationship with the modified point or line. For example, let's consider a case where the size (width and height) of a pattern is defined using body size, and at least a part of points or lines constituting the pattern is defined by including the body size as a parameter. In this case, when the body size is changed, the positions and sizes of points or lines related to the body size (that is, including the body size as a parameter) may also be automatically changed in association with the change of the body size. For example, if any one point is relatively defined according to a predetermined geometric relationship with respect to at least one or more other points, when the positions of at least some points among the at least one or more other points are changed, the any one point is modified according to the predetermined geometrical relationship. The line defined by these modified points is also automatically modified.

As described above, a new pattern element may be defined using a parametric pattern equation including previously defined pattern elements (the basic size of the pattern, points, lines, etc.), body sizes, user-defined parameters, etc. as parameters. Once a pattern is created in such a parametric design method, when body sizes are changed or pattern elements are modified later, the modifications are reflected in the parametric pattern equation and the pattern can be automatically modified. As before, if a pattern is created by defining the pattern element only with fixed sizes, the user has to redraw the pattern whenever there is a change in body size or modification of the pattern element. A pattern modification operation is performed very inefficiently compared to the present invention.

The method for creating a parametric pattern according to an example embodiment of the present invention may create points or lines constituting the pattern to have correlation with each other. The user can draw a pattern while sequentially defining points and lines. When any one pattern element is modified, other pattern elements created after the modification may be automatically modified according to their relevance. That is, if the position of any one point is changed, the positions of other points created after the any one point and related to the any one point may also be automatically changed according to the relationship with the any one point. According to the change of the position of the points, the geometric definition of the lines formed by the connection of the points may be also automatically changed. In this way, the pattern modification operation can be performed very efficiently.

When the drawing of the patterns constituting the garments is completed, virtual fitting information and virtual sewing information for the completed patterns may be defined (S148). It is possible to specify necessary sewing conditions for the generated patterns. That is, the user may specify a line segment to be sewn between patterns in the user interface 1000, and may specify a position where each pattern should be arranged in a space around the 3D human body model. Specifically, setting the sewing condition may be made by selecting lines to be sewn in a plurality of patterns and assigning the same sewing line number to the selected lines. When the sewing condition is specified, the sewing line number may be displayed on the lines representing the pattern. In the plurality of patterns, lines marked with the same sewing number indicate that they should be sewn together.

In addition, a fitting operator capable of modifying a pattern shape by moving a specific point or line segment when a parametric pattern is created may be defined and provided. Upon 3D garment drape simulation, the user may create the parametric pattern, and then fine-tune the pattern shape by applying an appropriate value to each fitting operator. By referring to the reference line created on the garment pattern, the fitting may be repeatedly performed until the desired garment shape is obtained. Specifically, it is possible to modify (widen, lengthen) the width and/or length of a specific part of the pattern by specifying desired points on the parametric pattern and moving their positions. That is, the work of finely adjusting the size or shape of the garments can be done (e.g., moving certain points toward the X-axis or Y-axis, or rotating a predetermined angle around a certain reference line or reference point, etc.). This allows a garment to be designed that fits people of the same size but different body types.

If there is any necessary modification to the pattern, the modification may also be made. Then, it is checked whether the modification operation for the pattern is completed (S150). If the modification is not yet completed, the process returns to step S142. When the modification is completed, the parametric pattern equation of the modified parametric pattern may be stored in the garment data storage & management unit 700. At this time, the parametric pattern equation data may be stored while having a linkage with the corresponding garments and flat sketch data, 3D simulation data, work order data, etc. related to the garments. The modified parametric pattern equation may be provided for virtual fitting/sewing simulation works in which the parametric patterns are virtually applied to and fitted with the 3D human body model by the 3D garment drape simulator 600 (S152). The completed parametric pattern may be saved in the form of a file. In addition, the completed parametric pattern may be applied to the 3D human body model.

Creation of the pattern may be performed using the flat sketch data obtained through the creation or retrieval of the flat sketch (S160). In the user interface 1000 of the parametric garment pattern maker 400, the user may retrieve the desired flat sketch data for the garment data storage & management unit 700 through a search and instruct a search for a parametric pattern equation connected to flat sketch data using the flat sketch data obtained through the search (S162). According to the instruction, the flat sketch data or the identification information of the flat sketch data may be provided to the garment data storage & management unit 700, and then the garment data storage & management unit 700 can search a parametric pattern equation connected to the flat sketch data.

The searched parametric pattern equation may be displayed on the screen of the display device 850 through the user interface 1000. In that state, the user may perform a series of pattern creation operations from step S142 to step S152 described above. According to this method, pattern creation may be completed by retrieving the parametric pattern equations of the pre-created garment patterns corresponding to the flat sketch data and simply performing the subsequent modification of the parametric patterns. Therefore, the pattern creation can be efficiently performed.

With respect to a new garment for which creation of the flat sketches and parametric patterns are completed already, the user may create a new work order for the manufacture of the garment (S170). The user may set a layout of the work order by using a tool provided by the user interface 1000 (S172). And a necessary work order may be made by using the set layout, and the flat sketch data and parametric patterns (equations) loaded from the garment data storage & management unit 700 (S174). The work order may be provided to the relevant garment manufacturing factory and used as a guideline for the garment production operation.

The completed work order may be sent to the garment data storage & management unit 700 which stores and manages work order data (S176). In this case, the completed work order may be stored while having a connection with identification information of the corresponding garment and/or the corresponding garment flat sketch data, parametric pattern equation data, 3D simulation result data, and the like. Thereby, the work order data may always be linked with the corresponding flat sketch data and parametric pattern data. By utilizing the linkage between these data, the work order making work may be done efficiently.

Figure 10:
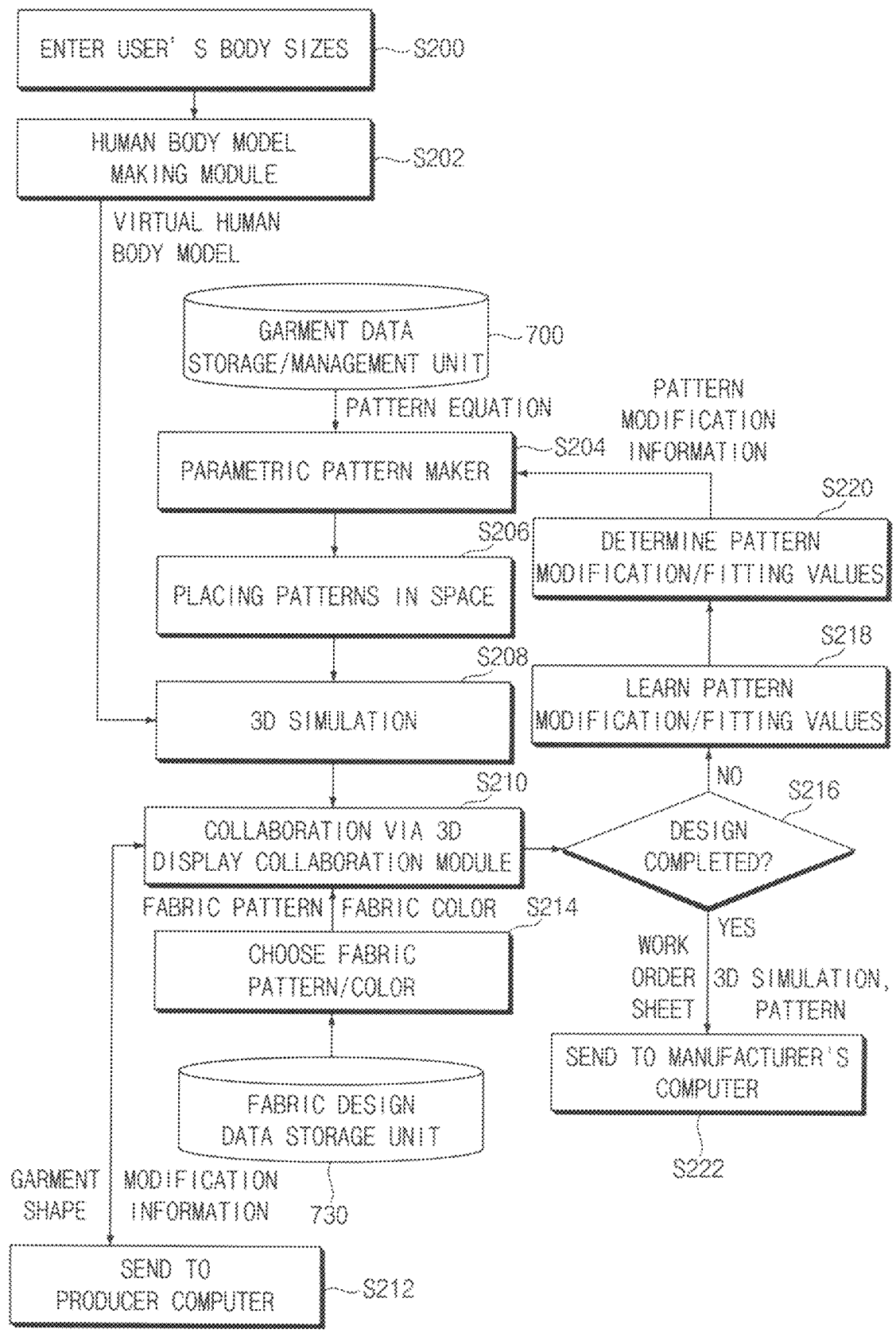
FIG. 10 is a flowchart illustrating a procedure for virtual fitting by virtually sewing parametric garment patterns and putting a virtually sewn garment on a 3D human body model to be virtually fitted using a 3D garment drape simulator according to an exemplary embodiment of the present invention.
Figure 11:
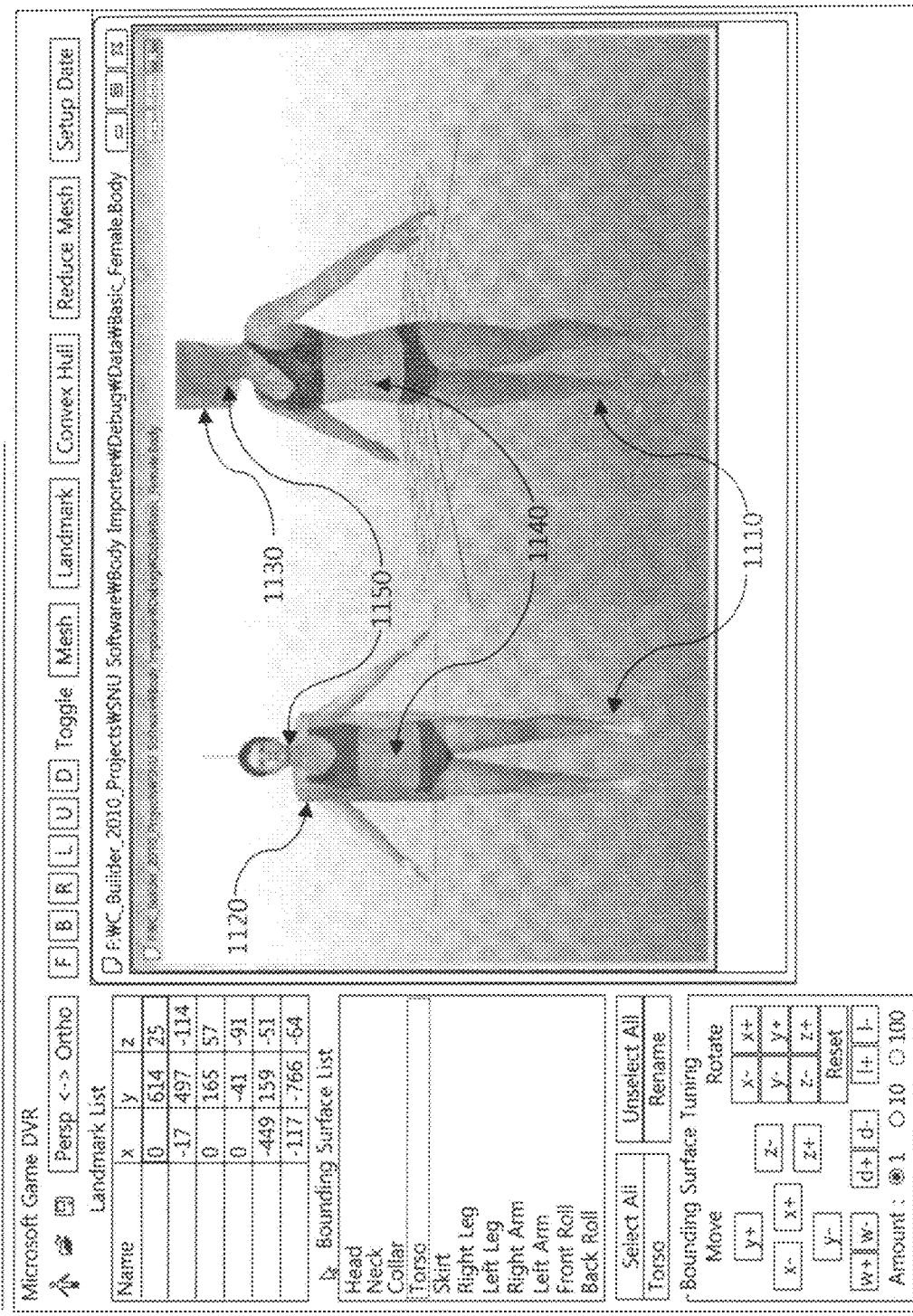
FIG. 11 illustrates a user interface screen for defining a body part boundary surface of a 3D human body model to be used in the 3D garment drape simulator according to an exemplary embodiment of the present invention.
Figure 12:
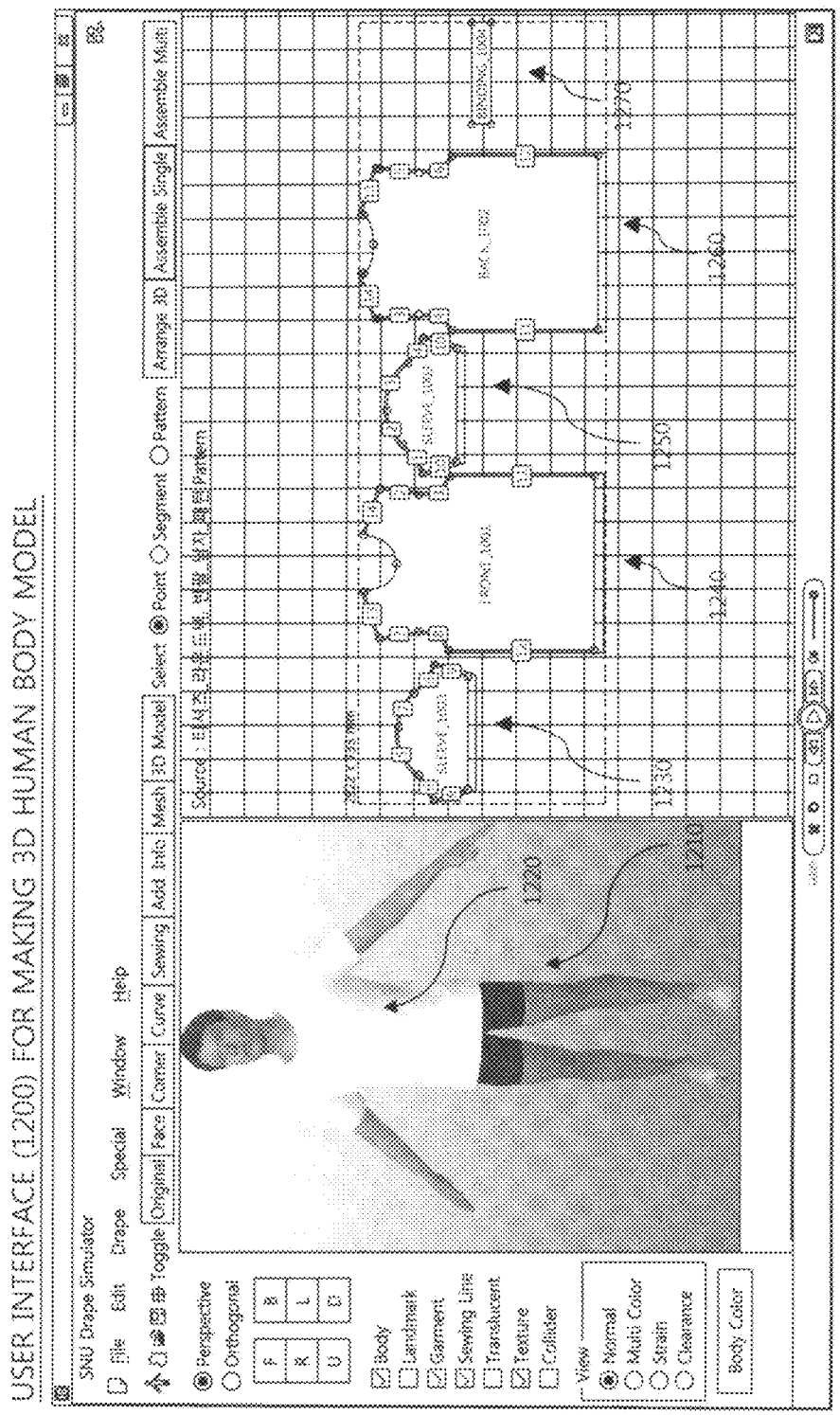
FIG. 12 illustrates a user interface screen of a three-dimensional garment drape simulator according to an exemplary embodiment of the present invention.

FIG. 10 is a flowchart illustrating a procedure for virtual fitting by virtually sewing parametric garment patterns and putting a virtually sewn garment on a 3D human body model to be virtually fitted using a 3D garment drape simulator according to an exemplary embodiment of the present invention. FIG. 11 illustrates a user interface screen for defining a body part boundary surface of a 3D human body model to be used in the 3D garment drape simulator 600 for garments according to an exemplary embodiment of the present invention. FIG. 12 illustrates a user interface screen of the 3D garment drape simulator 600 according to an exemplary embodiment of the present invention.

First, referring to FIG. 10, the user may load a 3D human body model and arrange completed garment patterns on the human body model. For such a 3D drape simulation, a virtual 3D human body model is required. To this end, the user may select and instruct the execution of a program for the human body model generation module 610 of the 3D garment drape simulator 600 stored in the data storage 830 through the input device 840. Accordingly, the program for the human body model generation module 610 may be executed by the processor 810, and a user interface 1100 for 3D human body model generation as illustrated in FIG. 11 may be displayed on the display device 850.

Figure 13:
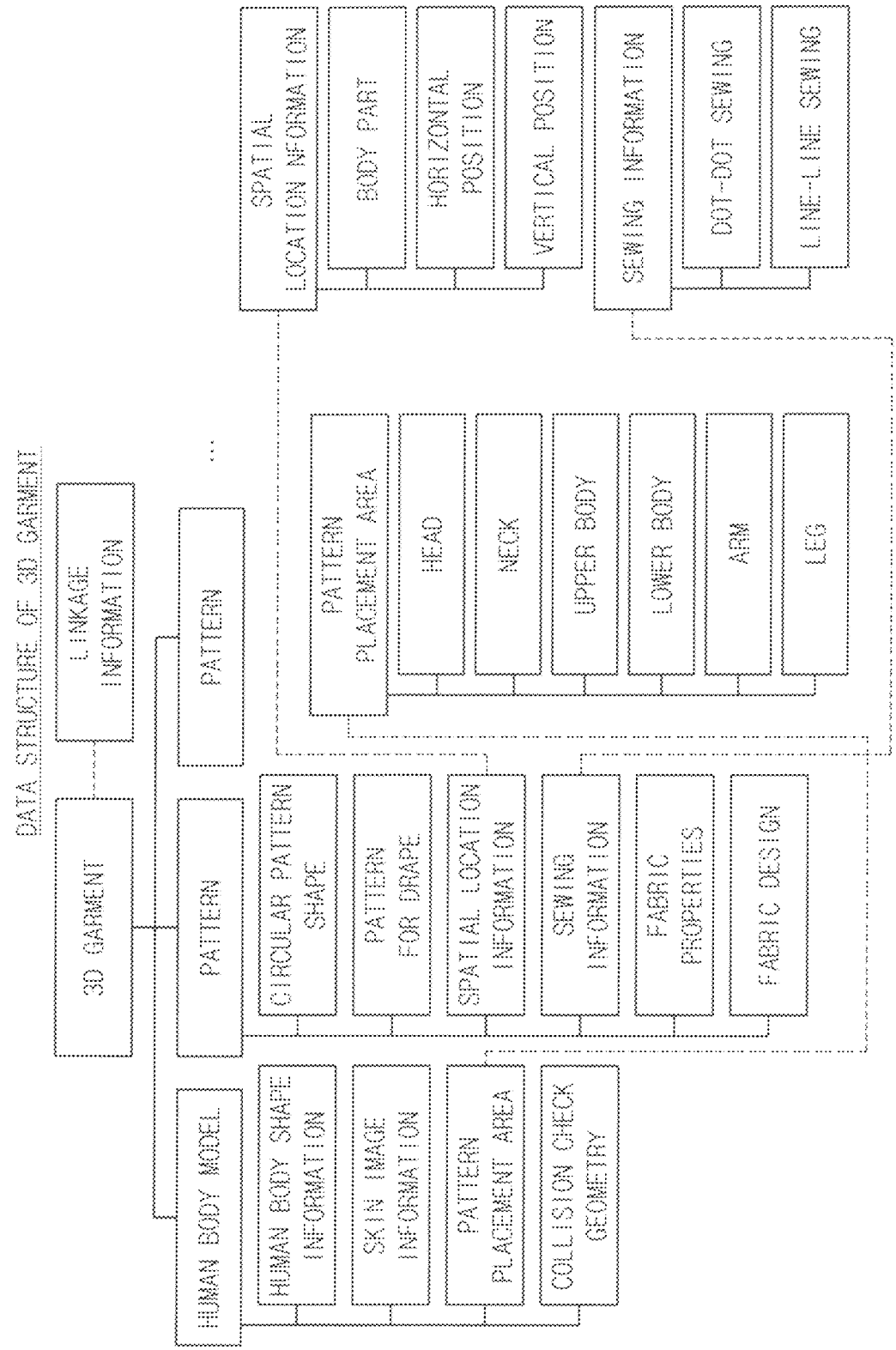
FIG. 13 illustrates a data structure of a three-dimensional garment for a three-dimensional drape simulation according to an exemplary embodiment of the invention.

FIG. 13 illustrates a data structure of a three-dimensional garment for a three-dimensional drape simulation according to an exemplary embodiment of the invention. Referring to FIG. 13, the 3D garment data may include information defining the shape of the 3D garment and the linkage information of the elements belonging to it. As an example, the linkage information may be unique identification information of the 3D garment. As another example, it may be connection information that can be connected with other elements (e.g., parametric pattern equations, 2D flat sketches, work orders, etc.) having a relationship with the 3D garment.

The 3D garment may include a 3D human body model to which the garment is applied, and a plurality of patterns. The information of the 3D human body model includes information on the human body shape (gender, body size, etc.), information on skin image, information on pattern arrangement part (i.e., information on body part boundary surface), and simplified shape information for collision inspection (e.g., simplified head, hand and foot part model) and the like. Here, the information on the pattern arrangement part may include information on which position each body part, such as a head, neck, upper body, lower body, arm, and leg should be arranged as a reference point.

Information on each of the parametric patterns may include an original pattern shape, a drape pattern, spatial location information of a 3D human body model, sewing information, material property information and design information of a fabric to be applied, and the like. Here, the spatial location information may include information on which part of the human body and the horizontal and vertical positions of the body part. The sewing information may include point-to-point sewing information, line-to-line sewing information, and the like.

The user may input the user's gender and body sizes in the user interface 1100 for 3D human body model generation (S200). Accordingly, the human body model generation module 610 may load the basic 3D human body model of the input gender and create a virtual 3D human body model to which the body sizes input by the user are applied (S202). The virtual 3D human body model 1110 created by the human body model generation module 610 may be provided to the 3D simulation module 620 and used for 3D drape simulation of garment patterns.

The 3D human body model 1110 illustrated in FIG. 11 is a female human body model. The 3D human body model may be pre-made as at least one or more human body models by applying basic body sizes to gender. The human body model generation module 610 may be designed such that when the user inputs other body sizes instead of the basic sizes of the human body model, the human body model generation module 610 may change the size of each body part of the human body model by interlocking according to the input body size.

Referring to FIG. 11, virtual body part boundary surfaces 1120 and 1130 may be set for each part of the human body in the 3D human body model 1110. The body part boundary surfaces 1120 and 1130 may be boundary surfaces serving as a reference for arranging patterns. The body part boundary surfaces may include the boundary surfaces such as head, neck, collar, torso, shirt, right leg, left leg, right arm, left arm, front roll, back roll, etc.

In an exemplary embodiment, the body part boundary surfaces 1120 and 1130 may have a cylindrical shape surrounding each body part. That is, information on points constituting each body part is known. Therefore, for each body part, a barrel including points of the corresponding body part may be defined, and the surface of the barrel may be the body part boundary surface. It is designed that when the size of the 3D human body model is changed, the size of the boundary surface of each body part may be changed in association with the input body size. FIG. 11 illustrates a head boundary surface 1130 surrounding the head and a body boundary surface 1120 surrounding the body.

Sewing conditions may be assigned to the 3D human body model. In the 3D human body model, reference points (landmarks) 1140 and 1150 indicating positions of body parts such as the waist and neck may be specified. The reference points 1140 and 1150 may serve as reference positions when arranging the parametric patterns on the boundary surfaces. In FIG. 11, reference points 1140 and 1150 are marked in red at the umbilicus point of the waist and the front upper center of the neck by way of example.

The user may retrieve the parametric patterns related to the desired garments from the garment data storage/management unit 700 using the user interface 1200 provided by the parametric pattern generator 640 (S204). FIG. 12 illustrates that in a state that the 3D human body model 1210 of a man is loaded, various garment patterns 1230, 1240, 1250, 1260, and 1270 necessary to make a men's shirt 1220 are loaded and displayed on the screen. The loaded garment patterns 1230, 1240, 1250, 1260, and 1270 may be generated in the parametric design method as mentioned above.

When creating a parametric pattern, arrangement information that determines where it should be placed on the 3D human body model may be set for each pattern. In an exemplary embodiment, each parametric pattern may have one or more pattern reference points (for example, the reference point may be specified such as the top center point of a rectangle surrounding each pattern) that become a reference when placed on the 3D human body model. A position of the pattern reference point may be appropriately set by the user. In addition, on the boundary surface of each body part of the 3D human body model, the reference point when the pattern is arranged, that is, the boundary surface reference point may be specified one or more. In arranging the patterns on the 3D human body model, the boundary surface (e.g., torso boundary surface, right leg boundary surface, etc.) of the body part of the human body model on which each pattern reference point is to be arranged may also be specified. It is possible to specify where the pattern is to be positioned in the vertical and horizontal directions, respectively.

The user may enter a user command into the user interface 1200 that the pattern should be placed on the human body model (S206). When such a user command is given, the 3D simulation module 620 automatically arranges the garment patterns 1230, 1240, 1250, 1260, and 1270 on the boundary surface of a specific body part of the 3D human body model 1210 according to preset arrangement information. Accordingly, a state in which a garment 1220 is applied to the 3D human body model 1210 may be expressed (S208). In FIG. 12, the 3D simulation module 620 shows a 3D drape simulation result by automatically arranging the parametric garment patterns 1230, 1240, 1250, 1260, and 1270 on the body boundary of the 3D human body model 1210 based on the arrangement information.

In this 3D drape simulation, the patterns may be placed in such a way that each of the pattern reference points set in each of the parametric garment patterns 1230, 1240, 1250, 1260, and 1270 is correspondingly superimposed on each of the reference points of the boundary surfaces of the body parts of the 3D human body model 1210. Accordingly, the corresponding pattern may be applied (arranged) to the correct position of the 3D human body model 1210.

In addition, each of the parametric patterns 1230, 1240, 1250, 1260, and 1270 may be provided with sewing condition information regarding portions to be coupled to each other. Therefore, the patterns 1230, 1240, 1250, 1260, and 1270 may be combined with each other on the body part boundary surface based on the sewing condition information. The patterns 1230, 1240, 1250, 1260, and 1270 illustrated in FIG. 12 are numbered for each line segment. The line segment number may correspond to the sewing condition information. That is, in a plurality of different patterns, line segments assigned the same number may mean a relationship to be sewn with each other.

The parametric patterns 1230, 1240, 1250, 1260, and 1270 may be virtually sewn and applied to the 3D human body model 1210. Then, through the 3D display/collaboration unit 630, related parties (flat sketch designers, pattern creators, producers, garments orderer, etc.) may remotely participate in a common virtual space to collaborate with each other (S212).

In a collaboration work process, the garment shape may be evaluated while variously applying several fabric patterns, fabric colors, and the like retrieved from the fabric design data storage 730. That is, after the garment 1220 is put on the 3D human body model 1210, color designation for each pattern may be possible (S214).

In addition, the 3D simulation module 620 may express the magnitude of the strain applied to the garment 1220 applied to the 3D human body model 1210, the magnitude of clearance between the worn garments and the body parts, and the like with colors.

Relevant parties may discuss modification of the shape of garments, etc. with reference to this information, and may modify the garments pattern according to the agreement. It is possible to learn a fitting value according to the modification of the garment pattern (S218). The applied pattern modification amount and the fitting value may be determined and transmitted to the parametric pattern generator 640 (S220). Through this process, a parametric pattern may be completed. The parametric pattern equation of the completed parametric pattern, a 3D simulation result, a work order, etc. may be provided to the garment data storage & management unit 700 again. The parametric pattern equations, 3D simulation results, work orders, etc. provided to the garment data storage & management unit 700 may be stored and managed while having a linkage with the garment information corresponding thereto (S220).

When the garment design modification is completed through this collaborative process (S216), the completed garment design information (i.e., 3D simulated garment shape, pattern, work order, etc.) may be transmitted to the factory computer 740 of the factory to manufacture the relevant garment. The manufacturing factory may produce the corresponding garment according to this information (S222).

Figure 14:
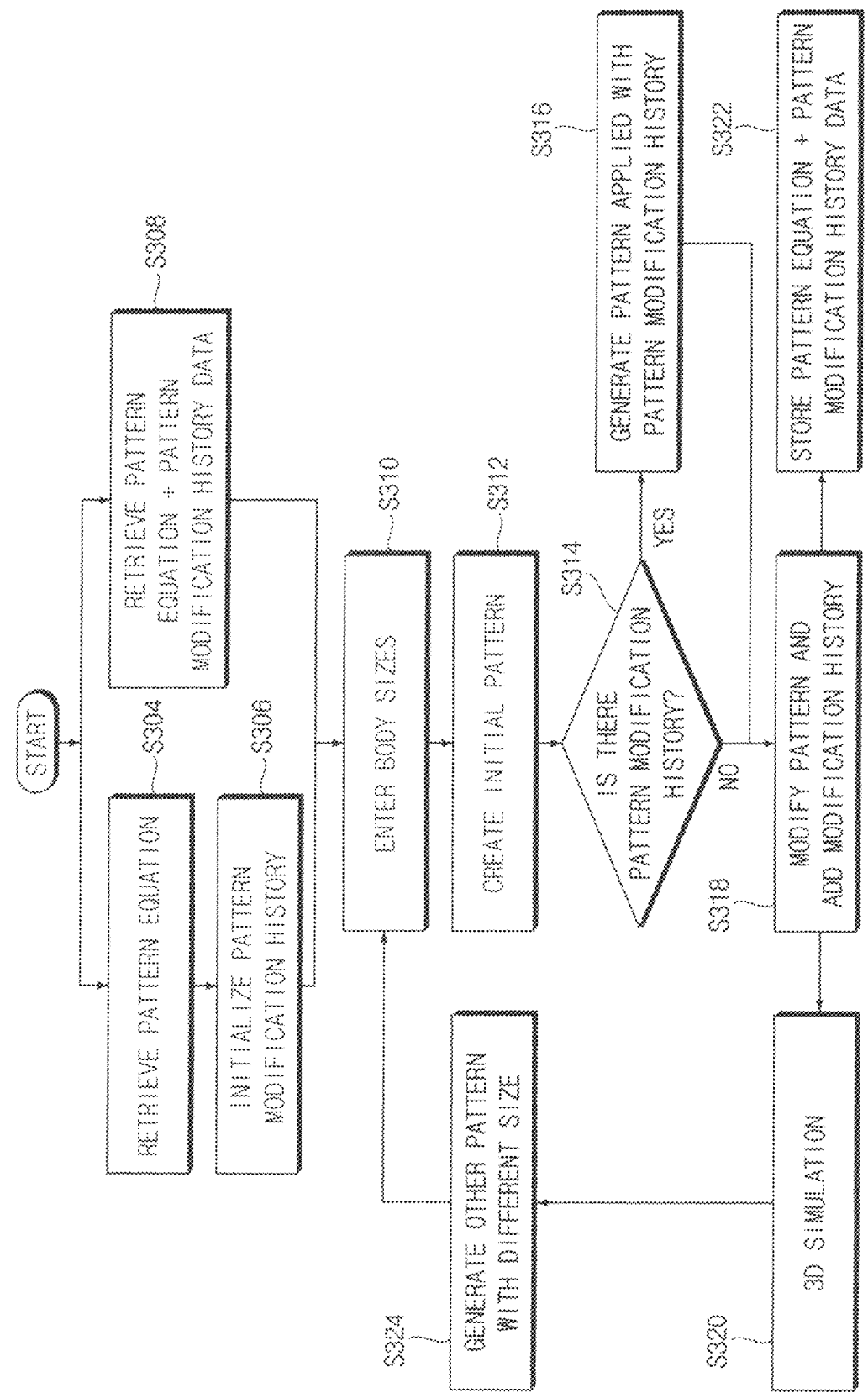
FIG. 14 is a flowchart illustrating a method of managing a revision history for a parametric pattern simulated by the 3D garment drape simulator according to an exemplary embodiment of the present invention.

On the other hand, in an exemplary embodiment, the parametric pattern generator 640 of the 3D garment drape simulator 600 may manage the modification history for the completed parametric pattern so that the modified patterns can be maintained without being lost. FIG. 14 illustrates a flowchart of a method of managing the modification history for a 3D drape simulated parametric pattern.

After the basic size patterns for a certain garment have been made in the parametric design method, patterns of other sizes can be easily created only by changing the size of the patterns of the basic size. Even in a state that parametric patterns are 3D drape simulated, the user may change the parametric patterns to those of other body sizes as well.

Compared with the patterns of the basic size, the parametric patterns changed to a different size may maintain the same shape as that of the patterns of the basic size, except that only their sizes are proportionally changed. This is because the basic size patterns were also made in the parametric design method. The pattern shape can be modified for parametric patterns simulated by 3D drape. However, in the case of changing the sizes, the pattern modifications made before the size change need to be separately saved. If not, modifications in the pattern shape made on the parametric patterns of the changed size may be volatilized without being reflected due to the properties of the parametric pattern, and the pattern of the changed size will be volatilized.

In order to prevent this problem, according to an exemplary embodiment, if the user has made modifications on the shape of the pattern generated by loading a parametric pattern equation, modifications regarding the shape of the pattern may be collected to be stored and managed separately in association with the corresponding pattern equation. Once the modification history of the pattern has been stored, even when a new pattern is created by changing the size of the pattern, the modifications previously made on the pattern may be equally reflected in the new pattern of the changed size. Therefore, having created a large number of basic parametric patterns in advance, the user may make subsequent parametric modifications using them even when the user creates new patterns derived from them. The principle that makes this possible is that if all the modifications to the parametric pattern made by the user in the parametric design method are saved, the user may create a new pattern of a different size based on the corresponding parametric pattern equation of the parametric pattern, and then load the modifications to the parametric pattern to be applied to the new pattern as they are.

This will be described in more detail with reference to the flowchart of FIG. 14. The parametric pattern generator 640 of the 3D garment drape simulator 600 may retrieve the information (pattern equation, sewing condition information, arrangement condition information, etc.) of parametric pattern to be drape-simulated from the garment data storage & management unit 700 (S304). At this time, if there is no modification for the parametric pattern, the pattern modification history may be initialized (S306). If there is a pattern modification history, the modification history may be stored in linkage with a corresponding parametric pattern equation. Therefore, when the parametric pattern equation of the pattern is loaded through retrieval, data related to the pattern modification history may be loaded together (S308).

To create a pattern of a size different from the body size of the loaded parametric pattern, a desired size may be input (S310). If a new size is entered, the entered size is applied, otherwise the original default size may be applied.

An initial parametric pattern may be created with a size determined according to the above criteria (S312).

Then, it may be checked whether there is a pattern modification history for the parametric pattern (S314).

If there is a pattern modification history, the pattern modification history may have been loaded in step S308. Therefore, a modified pattern may be created by applying the pattern modification history to the initial parametric pattern created in step S312 (S316). If there is no pattern modification history, the created initial pattern may be maintained as it is.

The created patterns may be displayed on the user interface screen 1300 for 3D drape simulation. According to an exemplary embodiment, a part of the display area of the 3D drape simulation user interface 1300 may be allocated as the 3D drape simulation image display area 1340, and the other area may be used as the parametric pattern display area 1350. The user can modify any one of the patterns to a desired shape while viewing the patterns displayed on the screen. All of the pattern modifications performed by the user can be recorded and added to the pattern modification history (S318).

Figure 15:
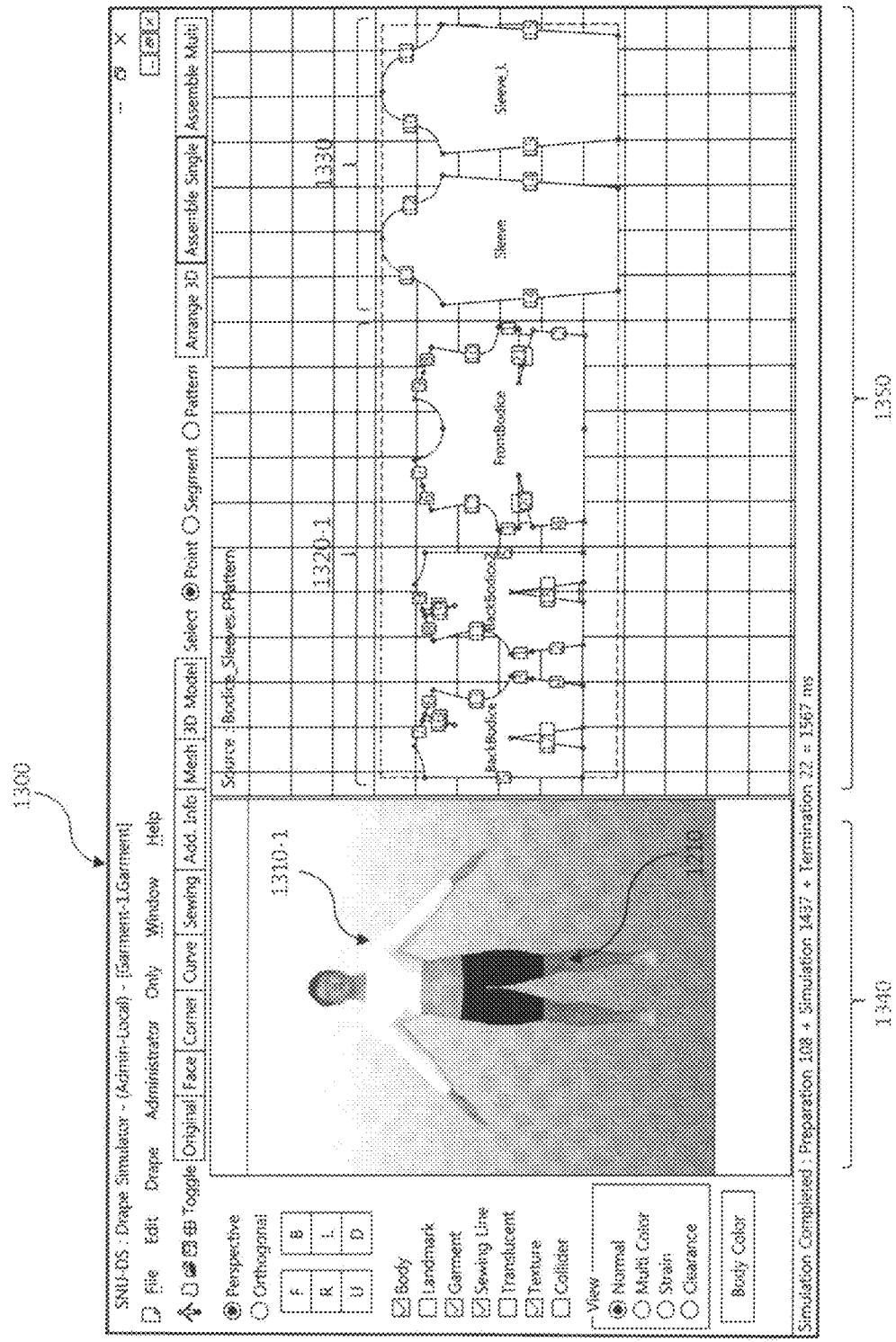
FIG. 15 illustrates a case in which a parametric pattern equation for a men's top stored is loaded to reproduce a pattern, and a drape simulation is performed on a 3D human body model in accordance with an exemplary embodiment of the present invention.
Figure 16:
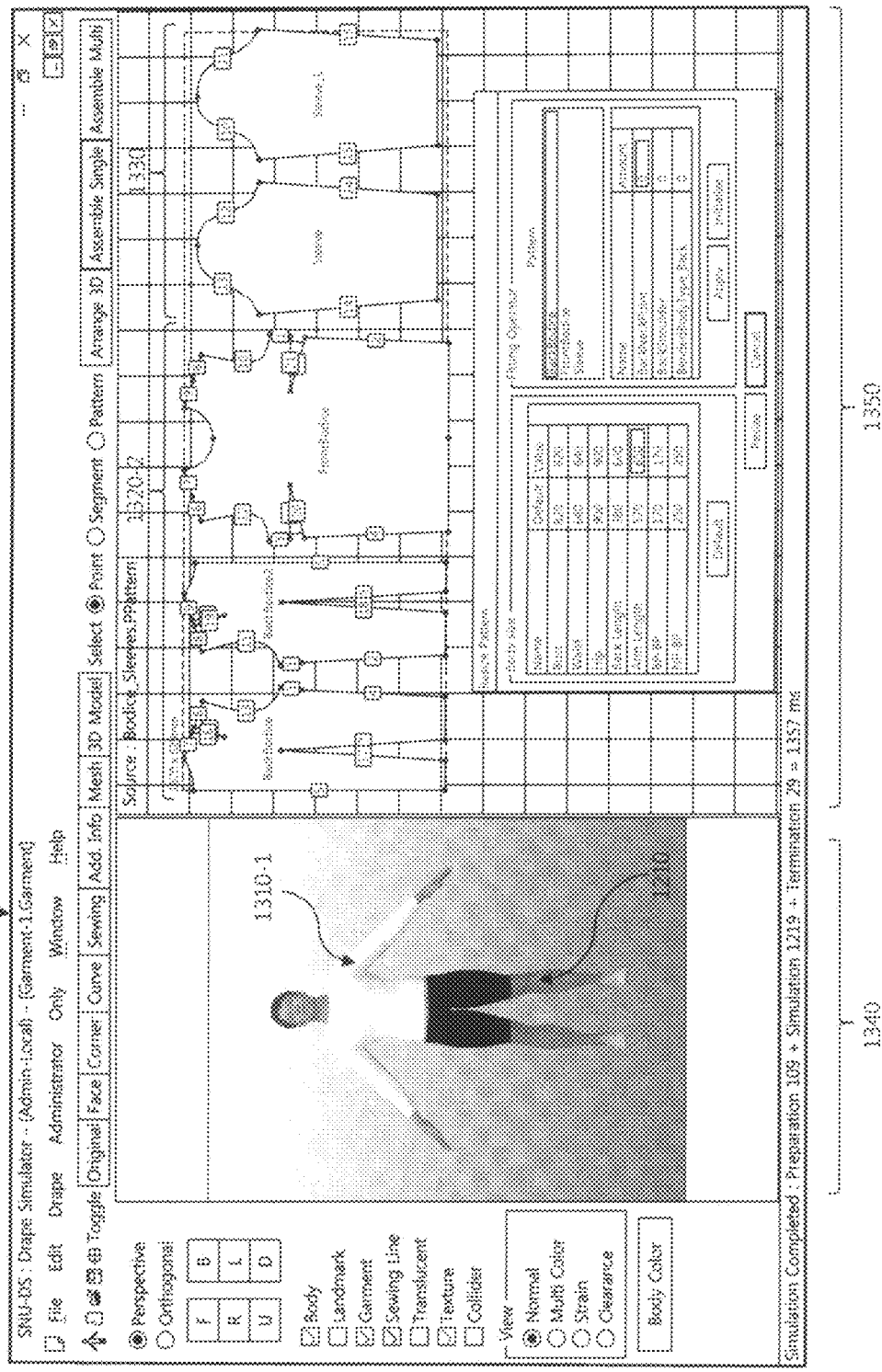
FIG. 16 illustrates a case in which patterns of the men's top shown in FIG. 15 are reproduced again and drape simulation is performed on the 3D human body model.

FIG. 15 illustrates that patterns are created using parametric pattern equations for a men's top loaded from the garment data storage & management unit 700 and drape-simulated on the 3D human body model 1210. FIG. 16 illustrates that modified patterns of the men's top shown in FIG. 15 are reproduced again and drape-simulated on the 3D human body model 1210.

As shown in FIG. 15, among the initial patterns 1320-1 and 1330 of the men's top 1310-1 loaded from the garment data storage & management unit 700, the body part pattern 1320-1 has a very short length that allows the navel to be exposed. The user may modify the pattern displayed in the parametric pattern display area 1350 as desired. For example, as shown in FIG. 16, while maintaining the arm pattern 1330 as it is, the body pattern 1320-1 may be changed to a modified pattern 1320-2 that is long enough to warm the navel by moving the points at the lower end thereof downward.

The shape of patterns may be modified in various ways. For example, it may be possible to make modifications such as digging deep the neckline of the top, widening the sleeves, or changing the lines set to be sewn to non-sewn.

Figure 17:
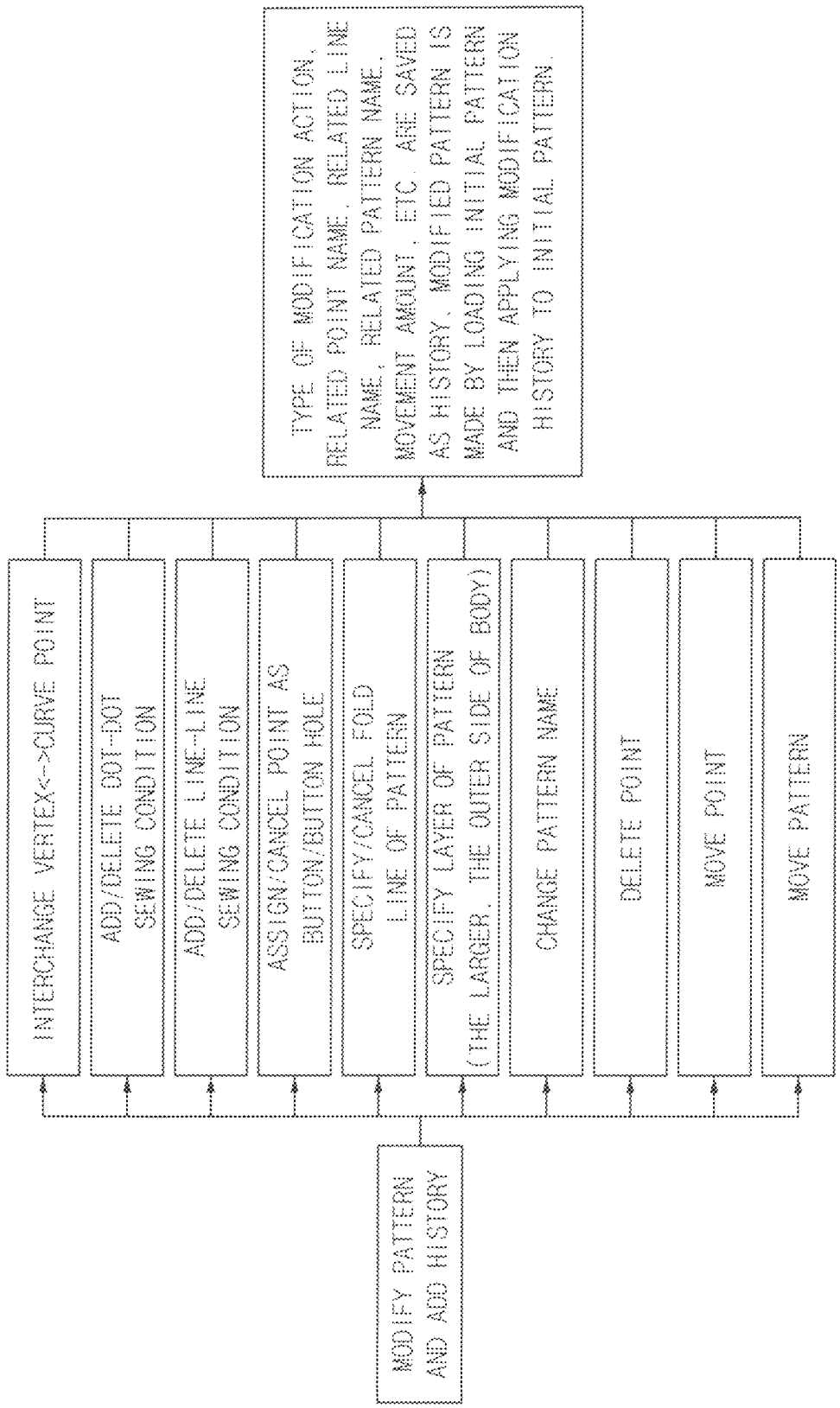
FIG. 17 shows types of pattern modification operations that can be performed in the 3D drape simulator according to an exemplary embodiment of the present invention.

FIG. 17 shows types of pattern modification operations that can be performed in the 3D drape simulator according to an exemplary embodiment of the present invention.

Referring to FIG. 17, the following modifications may be made to the parametric patterns displayed on the user interface screen for 3D drape simulation. However, the modification operations listed below are exemplary, and of course modification operations not listed are also possible: (i) converting a vertex into a point on a curve (non-vertex) or vice versa; (ii) adding sewing conditions between points or between lines, or deleting pre-specified sewing conditions; (iii) specifying a point as a button or buttonhole or canceling such specifying; (iv) specifying a line for folding the pattern or canceling a line so specified; (v) specifying the layer of the pattern (in this case, the larger the size of the pattern, the more it is placed on the outside of the body); (vi) renaming the pattern; (vii) deleting points or moving points that define the shape of the pattern; and (viii) moving the position of the pattern itself, etc.

When the pattern is modified, the type of modification operation, the name of the related point, the name of the related line, the name of the related pattern, the amount of movement, etc. may be stored as the pattern modification history. When a pattern is reproduced after the modification history of the pattern is stored, the initial pattern before the pattern modification may be reproduced first, and then a modified pattern may be reproduced by applying the pattern modifications according to the pattern modification history to the initial pattern.

In the above various pattern modification operations, the modification to change the shape of the pattern is to change the position of the point. A pattern modification operation other than the modification operation of moving the position of a point does not change the shape of the pattern, but specifies sewing conditions, etc. Therefore, this modification is a modification that can be performed if only the name of the point, the name of the line, and the name of the pattern related to the modification operation are taken as arguments. When moving the position of the point defining the pattern, it may be possible to move the point using relative coordinate instead of absolute coordinate. This is because if the point is moved using absolute coordinates, the shape of the entire pattern may not be harmoniously transformed when the size of the pattern is changed.

Figure 18:
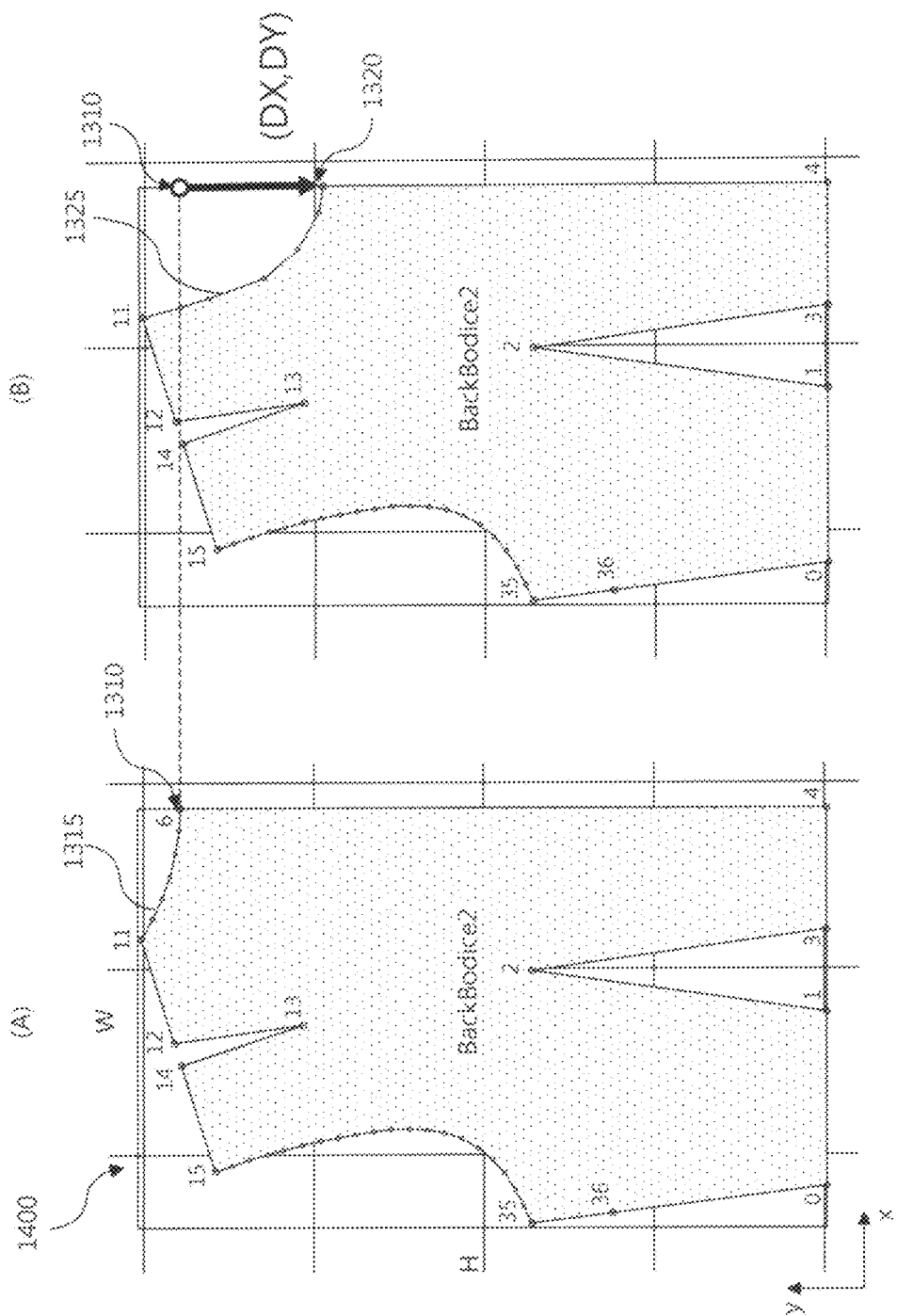
FIG. 18 illustrates a case in which the positions of specific points defining the shape of a pattern are moved in −y axis direction according to an exemplary embodiment of the present invention.

FIG. 18 illustrates a case in which the position of a specific point 1310 defining the shape of a pattern is moved in the opposite direction of y-axis direction according to an exemplary embodiment of the present invention. Here, if amounts of actual movement of the point 1310 in the x-axis direction and the y-axis direction are (DX, DY), the movement amount (dx, dy) in the x-axis direction and the y-axis direction recorded in the pattern modification history may be as follows.

$$dx = DX/W,$$

$$dy = DY/H \qquad \text{[Equation 1]}$$

Here, W and H represent the width and height of the pattern, respectively.

That is, when the pattern modification is recorded for the movement of the point defining the pattern, not the actual movement amount but the relative movement amount with respect to the width and height of the pattern may be recorded. In other word, the movement amount dx of the point 1310 in the x-axis direction may be determined by the ratio of the actual movement amount DX in the x-axis direction to the width W of the pattern, and the movement amount dy in the y-axis direction may be determined by the ratio of the actual movement amount DY in the y-axis direction to the height H of the pattern.

FIG. 19 is a diagram for describing an amount of movement of one point position moved previously when the size of the pattern is changed. In FIG. 19, if the size (width, height) of the pattern is changed from (W, H) to (W', H'), the new movement amount (DX', DY') of the position-moved point 1330 may be obtained as shown in the following equation using the relative movement amount (dx, dy) of the point position obtained in Equation 1 and the pattern size (W', H') after the change. That is, the position of the point 1340 after the positional movement may be determined as a position to which the position movement amounts (DX', DY') from the original position of the point 1330 are applied.

$$DX' = dx \times W'$$

$$DY' = dy \times H' \qquad \text{[Equation 2]}$$

When the initial pattern or a pattern modified from the initial pattern is secured, a 3D drape simulation may be performed in which a 3D human body model is called and the patterns are applied to the 3D human body model (S320). Separately, the history of modification of the pattern performed in step S318 may be transferred to the garment data storage & management unit 700 together with the parametric pattern equation of the simulated pattern to be stored (S322). That is, if the user modifies the shape of a parametric pattern of a certain size (e.g., modification to dig deeper the neckline by moving points, etc.), the modified details may be collected and linked with the corresponding parametric pattern equation to be stored separately in the garment data storage & management unit 700.

In an exemplary embodiment, the pattern may be re-created by changing a body size to another size (S324). To this end, a new body size may be input (S310). If there is such a size change, since there is a history of pattern modification conducted previously, 'pattern equation+pattern modification history' may be loaded (S308) to generate an initial pattern (S312). After generating the initial pattern by applying the basic pattern equation (S312), a modified pattern may be created by additionally applying the pattern modification history performed before that to the generated initial pattern (S316). The pattern created in this way is a modified pattern that reflects the pattern modification performed previously.

Additional modification may be made on the modified pattern (S318). The modified pattern may be displayed on the interface screen. Drape simulation may be performed on the 3D human body model (S320). In addition, the additional modification history may also be stored in the garment data storage & management unit 700 in addition to the existing pattern modification history (S322). In this way, in addition to the parametric pattern equation related to the basic pattern, the pattern modification history over two times may be stored together. When the pattern is called again next time (S308), the pattern modification history performed twice in addition to the basic parametric pattern equation may be called together. In addition, when creating the pattern using the called data, a modified pattern may be created by reflecting the pattern modification history of two times on the pattern generated by the basic pattern equation (S316).

In this way, if the modification history for the parametric pattern is stored and then recalled and applied when the parametric pattern is created, a modified pattern in which the modification history is reflected can be created. In addition, even when the parametric pattern is resized by changing the body size, the modification history may be reflected in the same way. That is, when a new pattern is created by modifying a part of the parametric pattern and then adjusting the sizes, the pattern modifications made previously can be maintained. Therefore, if the user creates a plurality number of basic parametric patterns, the user can continue to make parametric transformations even if the user creates new patterns derived from them.

As described above, according to the exemplary embodiments of the present invention, if patterns of a garment to be produced are created in a parametric design method and the conditions for 3D simulation to be applied to a 3D human body model are specified only once, the user can instruct the 3D drape simulation in real time while changing the body size in various ways. When a person's body size is changed, the size and shape of each parametric pattern may also be automatically changed in association with the changed body size. In addition, the seam line and the like may be automatically changed. The user can directly try the changed patterns on the 3D human body model. In addition, the size and/or shape of the completed parametric pattern may be modified while the pattern is displayed, and the modified patterns may be applied directly to the 3D human body model. Furthermore, a 3D simulation in which the patterns of the changed size are directly applied to the 3D human body model can be performed. As described above, by using the parametric pattern creation technology and the 3D drape simulation creation technology according to the present invention, it is possible for the user to check conveniently the shape of garment in real time while changing the body size.

The method according to the embodiments of the present invention described above may be implemented in the form of program codes that can be executed through various types of computing means and recorded in a computer-readable medium. The computer-readable medium may include program codes, data files, data structures, etc. alone or in combination. The program codes recorded on the medium may be specially designed and configured for the embodiment. Examples of the computer-readable recording medium include magnetic media such as hard disks, floppy disks and magnetic tapes, optical media such as CD-ROMs and DVDs, and magneto-optical media such as floptical disk, and hardware devices specially configured to store and execute program instructions, such as ROM, RAM, flash memory, and the like. Examples of program codes may include not only machine language codes such as those generated by a compiler, but also high-level language codes that can be executed by a computer using an interpreter or the like. The hardware devices mentioned above may be configured to operate as one or more software modules to perform the operations of the embodiments, and vice versa.

INDUSTRIAL APPLICABILITY

The present invention can be widely used in the field of garment design. In particular, it can be used as a garment design technique that consistently and integratively performs the entire process of garment design. Furthermore, the garment design system according to the present invention can be integrated with the garment production system. Garment consumers, designers, producers, and sellers can all participate together to build a garment platform that can perform tasks such as ordering, designing, producing, and selling garment in an integrated and connected manner.

Although the embodiments have been described with reference to the limited drawings as described above, it can be understood that those skilled in the art can variously modify and change the present invention within the scope without departing from the spirit and scope of the present invention described in the claims below. For example, the described techniques may be performed in a different order than the described method, and/or the described components of the system, structure, apparatus, circuit, etc. may be connected or combined in a different form than the described method, or replaced or substituted by other components or equivalents, which may achieve an appropriate result. Therefore, other implementations, other embodiments, and equivalents to the claims are intended to be included within the scope of the following claims.

What is claimed is:

1. A system for creating a garment design, comprising:
a computer device comprising a processor and a memory; and
a non-transitory computer-readable storage medium, being accessible by the processor, for storing program codes;
wherein the program codes, when executed by the processor, causes the processor to:
provide a first user interface including a pattern creation tool unit requested by a user through a display screen so that the user can create parametric garment patterns of a garment in a parametric design method, wherein the pattern creation tool unit is configured to provide a first function for the user to define pattern elements including points and lines defining pattern geometry of a parametric garment pattern desired by the user in the parametric design method to be displayed on the display screen, and a second function for the user to set sewing condition information including information specifying seam lines to be sewn with each other between parametric garment patterns created using the first function, and arrangement condition information of the parametric garment patterns on a three-dimensional (3D) human body model;
store parametric pattern equations defining parametric garment patterns created by using the first function and the second function of the pattern creation tool unit, sewing condition information and arrangement condition information set, in linkage with the identification information of the garment in a data storage;
display a predetermined 3D human body model requested by the user on the display screen;
search parametric pattern equations, sewing condition information and arrangement condition information corresponding to parametric garment patterns of the garment requested by the user from the data storage;
automatically place and virtually sew parametric garment patterns corresponding to the searched parametric pattern equation on the 3D human body model according to the searched sewing condition information and arrangement condition information so that a 3D drape simulation image of the garment applied to the 3D human body model is created to be displayed on the display screen; and
store the created 3D drape simulation image in linkage with the garment in the data storage.

2. The system for creating a garment design according to claim 1, wherein a parametric garment pattern equation and a 3D drape simulation image for the same garment, stored in the data storage, are linked with each other so that one can be retrieved from the other.

3. The system for creating a garment design according to claim 1, wherein the pattern creation tool unit is configured to further provide a function of generating a body size list in which one or more body part sizes are included, and a parameter list in which one or more parameters defined by including a desired body part size among the one or more body part sizes as a parameter are included.

4. The system for creating a garment design according to claim 1, wherein the program codes, when executed by the processor, causes the processor to provide, via the display screen, a second user interface comprising a flat sketch creation tool capable of drawing a garment flat sketch requested by the user, and to make a garment flat sketch created using the flat sketch creation tool on the display screen be linked with at least one of a corresponding garment, a parametric pattern equation associated with the corresponding garment, and a 3D drape simulation image associated with the corresponding garment, to be stored in the data storage.

5. The system for creating a garment design according to claim 4, wherein the flat sketch creation tool provides a function of specifying a coupling reference point that the allows the user to set a coupling reference point that becomes a reference when combining a single garment flat sketch or a flat sketch group including a plurality of garment flat sketches with other garment flat sketch, and allow the garment flat sketches of which coupling reference points are set to be coupled with each other by automatically adjusting sizes and orientations of the garment flat sketches so that their coupling reference points are overlapped with each other.

6. The system for creating a garment design according to claim 4, wherein the program code, when. executed by the processor, causes the processor to search desired flat sketch data from the data storage, and search a parametric pattern equation in linkage with flat sketch data searched from the data storage.

7. The system for creating a garment design according to claim 1, wherein the program code, when executed by the processor, causes the processor to provide a function to make a work order regarding a parametric garment pattern created through the first user interface, and to store the work order made in the data storage in linkage with a parametric pattern equation of corresponding parametric garment pattern.

8. The system for creating a garment design according to claim 1, wherein at least a part of the points defining a shape of the parametric garment pattern is generated such that position of the at least a part of the points is determined by a predetermined relation including a position of previously generated point as a parameter.

9. The system for creating a garment design according to claim 1, wherein the program code, when executed by the processor, causes the processor to allow the user to modify a shape of a parametric garment pattern by moving a position of a desired point among points defining the shape of the parametric garment pattern displayed on a display screen, and when the position of the desired point is moved, to change positions of other points that are defined by a predetermined relational expression including the position of the desired point as a parameter together according to a position movement amount of the desired point and the predetermined relational expression.

10. The system for creating a garment design according to claim 1, wherein a barrel-shaped body part boundary surface surrounding a corresponding body part is set for each body part of the predetermined 3D human body model, and wherein the arrangement condition information includes information on which body part boundary surfaces of the predetermined 3D human body model the parametric garment patterns should be arranged on respectively.

11. The system for creating a garment design according to claim 10, wherein the arrangement condition information includes information on a pattern reference point used as a reference and boundary surface information on which body part boundary surface of the 3D human body model the pattern reference point should be placed on when the parametric garment patterns are placed on the 3D human body model, and the 3D human body model includes boundary reference points each of which is specified for each corresponding body part boundary surface, and wherein the program code, when executed by the processor, causes the processor, when arranging the parametric garment pattern on the 3D human body model, to arrange the parametric garment pattern so that a pattern reference point of the parametric garment pattern overlaps a boundary reference point of a boundary surface of a body part corresponding to the boundary surface information.

12. The system for creating a garment design according to claim 1, wherein the program code, when executed by the processor, causes the processor to function as a server computer for a plurality of client computer devices; allow any of the client computer devices connected to the processor to create a collaboration room; provide desired parametric garment patterns and/or 3D drape simulation images to client computer devices of relevant parties participating in the collaboration room to be displayed on each client computer device; and support communications so that the relevant parties participating in the collaboration room can exchange opinions and/or collaborate modifications while viewing the displayed parametric garment patterns and/or 3D drape simulation images.

13. The system for creating a garment design according to claim 1, wherein the program code, when executed by the processor, causes the processor to provide a function to display identifiably amounts of strains applied to respective parts of the predetermined garment on the 3D human body model on the 3D drape simulation image.

14. The system for creating a garment design according to claim 1, wherein the program code, when executed by the processor, causes the processor to provide a function to display identifiably a size of a gap between the predetermined garment put on the 3D human body model and a corresponding body part of the 3D human body model, on the 3D drape simulation image.

15. The system for creating a garment design according to claim 1, wherein the program code, when executed by the processor, causes the processor to assign unique identification information to each individual garment, and storing parametric pattern equations, set sewing condition information and arrangement condition information, and a 3D drape simulation image for each garment in linkage with each other through the identification information of the each garment.

16. The system for creating a garment design according to claim 1, wherein the program code, when executed by the processor, causes the processor to retrieve a pattern modification history if the pattern modification history is stored in linkage with a parametric pattern equation in the data storage when searching the parametric pattern equation from the data storage; generate the parametric garment pattern on the display screen to be displayed using the parametric pattern equation searched so that the user can modify a shape of the parametric garment pattern; and when there is a modification to the parametric garment pattern, collect a relevant pattern modification history to be stored in the data storage in linkage with a corresponding parametric pattern equation.

17. The system for creating a garment design according to claim 16, wherein the program code, when executed by the processor, causes the processor, when both a parametric pattern equation and a pattern modification history for a pattern having a modification history are loaded together, to generate an initial pattern first using the parametric pattern equation and then a modified pattern to be displayed on the display screen by applying the pattern modification history to the initial pattern.

18. The system for creating a garment design according to claim 16, wherein program code, when executed by the processor, causes the processor to allow the user to modify a shape of the parametric garment pattern by moving a position of points defining the garment pattern, wherein when a position of the point is actually moved by DX in a X-axis direction and/or by DY in a Y-axis direction through modification of the parametric garment pattern, a movement amount dx in the X-axis direction and/or a movement amount dy in the Y-axis direction to be stored in the data storage as pattern modification history is determined as a movement amount relative to width and height of the parametric garment pattern by $dx=DX/W$ and $dy=DY/H$, where W and H represent the width and height of the parametric garment pattern, respectively.

19. A method of creating a garment design, comprising executing a sequence of instructions for causing a processor of a computing system to perform a plurality of functions related to garment design, wherein the plurality of functions include:
- a function of providing a pattern creation tool unit including a first function for a user to define pattern elements including points and lines defining pattern geometry of a desired parametric garment pattern in a parametric design method to be displayed on a display screen, and a second function for the user to set sewing condition information including information specifying seam lines to be sewn with each other between parametric garment patterns created using the first function, and arrangement condition information of the parametric garment patterns on a three-dimensional (3D) human body model,
- a function of providing a first user interface including the pattern creation tool unit requested by the user through the display screen so that the user can create parametric garment patterns of a garment in the parametric design method;
- a function of storing parametric pattern equations defining parametric garment patterns created by using the first function and the second function of the pattern creation tool unit, sewing condition information and arrangement condition information set, in linkage with the identification information of the garment in a data storage;
- a function of displaying a predetermined 3D human body model requested by the user on the display screen;
- a function of searching parametric pattern equations, sewing condition information and arrangement condition information corresponding to parametric garment patterns of the garment requested by the user from the data storage;
- a function of automatically placing and virtually sewing parametric garment patterns corresponding to the searched parametric pattern equations on the 3D human body model according to the searched sewing condition information and arrangement condition information so that a 3D drape simulation image of the garment applied to the 3D human body model is created to be displayed on the display screen; and a function of storing the created 3D drape simulation image in linkage with the garment in the data storage.

20. The method of creating a garment design according to claim 19, wherein the plurality of functions further include a function of storing parametric garment pattern equations and a 3D drape simulation image for a garment to have an association with each other so that any one data can be searched form the other data.

21. The method of creating a garment design according to claim 19, wherein the plurality of functions further include functions of providing, via the display screen, a second user interface comprising a flat sketch creation tool capable of drawing a garment flat sketch requested by the user, and making a garment flat sketch created using the flat sketch creation tool on the display screen be linked with at least one of a corresponding garment, a parametric pattern equation associated with the corresponding garment, and a 3D drape simulation image associated with the corresponding garment, to be stored in the data storage.

22. The method of creating a garment design according to claim 19, wherein the plurality of functions further include a function of generating at least a part of points defining a shape of the parametric garment pattern is determined by a predetermined relation including a position of previously generated point as a parameter.

23. The method of creating a garment design according to claim 19, wherein the plurality of functions further include functions of: allowing the user to modify a shape of a parametric garment pattern by moving a position of a desired point among points defining the shape of the parametric garment pattern displayed on the display screen; and when the position.

24. The method of creating a garment design according to claim 19, wherein the arrangement condition information includes information on a pattern reference point used as a reference and boundary surface information on which body part boundary surface of the 3D human body model the pattern reference point should be placed on when the parametric garment patterns are placed on the 3D human body model, and the 3D human body model includes boundary reference points each of which is specified for each corresponding body part boundary surface, and wherein the program code, when executed by the processor, causes the processor, when arranging the parametric garment pattern on the 3D human body model, to arrange the parametric garment pattern so that a pattern reference point of the parametric garment pattern overlaps a boundary reference point of a boundary surface of a body part corresponding to the boundary surface information.

25. The method of creating a garment design according to claim 19, wherein the plurality of functions further includes: causing the processor to function as a server computer for a plurality of client computer devices; allowing any of the client computer devices connected to the processor to create a collaboration room; providing desired parametric garment patterns and/or 3D drape simulation images to client computer devices of relevant parties participating in the collaboration room to be displayed on each client computer device; and supporting communications so that the relevant parties participating in the collaboration room can exchange opinions and/or collaborate modifications while viewing the displayed parametric garment patterns and/or 3D drape simulation images.

26. The method of creating a garment design according to claim 19, wherein the plurality of functions further includes functions of: retrieving a pattern modification history if the pattern modification history is stored in linkage with a parametric pattern equation in the data storage when searching the parametric pattern equation from the data storage; allowing the user to modify a shape of a parametric garment pattern by generating the parametric garment pattern on the display screen to be displayed using the parametric pattern equation searched; and when a modification to the parametric garment pattern is made, collecting a relevant pattern modification history to be stored in the data storage in linkage with a corresponding parametric pattern equation.

27. The method of creating a garment design according to claim 26, wherein the plurality of functions further includes a function of, when both a parametric pattern equation and a pattern modification history for a pattern having a modification history are loaded together, creating first an initial pattern using the parametric pattern equation and then a modified pattern to be displayed on the display screen by applying the pattern modification history to the initial pattern.

28. An application program combined with hardware of a computer device to create a desired garment design and stored on a computer-readable recording medium, comprising:

a garment data storage/management unit for storing and managing data related to garments in a data storage stored on the computer-readable recording medium, data relating to garments comprising parametric garment pattern equation data and three-dimensional (3D) drape simulation data, the parametric garment pattern equation data and three-dimensional (3D) drape simulation data corresponding to each individual garment is stored in the data storage so as to be linked with each other; and a function of providing a search result by searching data requested by a user from the data stored in the data storage;

a parametric pattern making unit or providing a first user interface including a pattern creation tool unit through a display screen so that the user can create parametric garment patterns of a garment in a parametric design method, wherein the pattern creation tool unit includes a first function for the user to define pattern elements including points and lines defining pattern geometry of a desired parametric garment pattern in the parametric design method to be displayed on the display screen, and a second function for the user to set sewing condition information including information specifying seam lines to be sewn with each other between parametric garment patterns created using the first function, and arrangement condition information of the parametric garment patterns on a 3D human body model; a function of setting sewing condition information for created parametric garment patterns and arrangement condition information of the parametric garment patterns on the 3D human body model; and a function of associating a parametric pattern equation defining created parametric garment patterns, and set sewing condition information and arrangement condition information with identification information of the garment and providing the associated information to the garment data storage/management unit as data related to garments to be stored in the data storage; and a 3D drape simulation unit for searching parametric pattern equations, sewing condition information and arrangement condition information corresponding to parametric garment patterns of the garment requested by the user from the data related to garments in the data storage; a function of automatically placing and virtually sewing parametric garment patterns corresponding to the searched parametric pattern equations on the 3D human body model according to the searched sewing condition information and arrangement condition information so that a 3D drape simulation image of the garment applied to the 3D human body model is created; a function of displaying the created 3D drape simulation image on the display screen; and a function of storing the created 3D drape simulation image in linkage with the data related to garments in the data storage of the garment data storage/management unit.

\* \* \* \* \*